United States Patent
Parker et al.

(10) Patent No.: US 9,354,043 B2
(45) Date of Patent: *May 31, 2016

(54) METHODS FOR MEASURING AND MODELING THE STRUCTURAL HEALTH OF PRESSURE VESSELS BASED ON ELECTRONIC DISTANCE MEASUREMENTS

(75) Inventors: David H. Parker, Earlysville, VA (US); John M. Payne, Charlottesville, VA (US); Sophie Lin, legal representative, Charlottesville, VA (US)

(73) Assignees: Laura P. Solliday, Green Bank, WV (US); Sophie Lin, Trustee of the John Michael Payne Family Trust, Charlottesville, VA (US)

( * ) Notice: Subject to any disclaimer, the term of this patent is extended or adjusted under 35 U.S.C. 154(b) by 811 days.

This patent is subject to a terminal disclaimer.

(21) Appl. No.: 13/485,845

(22) Filed: May 31, 2012

(65) Prior Publication Data

US 2012/0250004 A1  Oct. 4, 2012

Related U.S. Application Data

(63) Continuation-in-part of application No. 12/973,842, filed on Dec. 20, 2010, now Pat. No. 8,209,134, which is a continuation-in-part of application No. 12/328,210, filed on Dec. 4, 2008, now Pat. No. 7,895,015.

(51) Int. Cl.
*G01C 15/00* (2006.01)
*G01C 3/00* (2006.01)
*G01B 11/03* (2006.01)
*G01B 11/16* (2006.01)
*E01B 1/00* (2006.01)
*E04B 1/00* (2006.01)

(52) U.S. Cl.
CPC . *G01B 11/03* (2013.01); *E04B 1/00* (2013.01); *G01B 11/16* (2013.01); *G01C 3/00* (2013.01); *G01C 15/002* (2013.01)

(58) Field of Classification Search
CPC .......... E04B 1/00; G01B 11/16; G01B 11/03; G01C 15/002; G01C 3/00
See application file for complete search history.

(56) References Cited

U.S. PATENT DOCUMENTS 3,865,688 A    2/1975  Kleimola
4,045,289 A    8/1977  Seidensticker
4,050,983 A    9/1977  Kleimola (Continued)

OTHER PUBLICATIONS

Boavida et al., Dam Monitoring Using Combined Terrestrial Imaging Systems, May 2008, 13th Symposium of Deformation Measurement and Analysis.*

(Continued)

Primary Examiner — Regis Betsch
(74) Attorney, Agent, or Firm — David H. Parker

(57) ABSTRACT

Methods are disclosed wherein the structural health of a civil structure, pressure vessel, or the like is measured by electronic distance measurement (EDM) from a plurality of stable locations to a plurality of cardinal points on the structure in a methodical manner. By measuring the coordinates of the cardinal points, the dynamic and long-term static behavior of the structure provide an indication of the health of the structure. Analyses includes: comparison to a Finite Element Model (FEM); comparison to historical data; and modeling based on linearity, hysteresis, symmetry, creep, damping coefficient, and harmonic analysis.

23 Claims, 10 Drawing Sheets

(56) References Cited

U.S. PATENT DOCUMENTS

| | | |
|---|---|---|
| 4,080,256 A | 3/1978 | Braun |
| 4,113,381 A | 9/1978 | Epstein |
| 4,128,011 A | 12/1978 | Savage |
| 4,409,842 A | 10/1983 | Scott |
| 4,457,625 A | 7/1984 | Greenleaf |
| 4,473,528 A | 9/1984 | Kleimola |
| 4,480,480 A | 11/1984 | Scott |
| 4,549,437 A | 10/1985 | Weins |
| 4,621,926 A | 11/1986 | Merry |
| 4,691,446 A | 9/1987 | Pitches |
| 4,714,339 A | 12/1987 | Lau |
| 4,790,651 A | 12/1988 | Brown |
| 4,805,540 A | 2/1989 | Mundloch |
| 4,927,596 A | 5/1990 | Minnick |
| 5,076,173 A | 12/1991 | Baker |
| 5,180,969 A | 1/1993 | Kwun |
| 5,195,046 A | 3/1993 | Gerardi |
| 5,351,625 A | 10/1994 | Culligan |
| 5,455,670 A | 10/1995 | Payne |
| 5,467,719 A | 11/1995 | Dalrymple |
| 5,657,003 A | 8/1997 | Fuentes |
| 5,764,360 A | 6/1998 | Meier |
| 5,814,731 A | 9/1998 | Alexander |
| 5,841,353 A | 11/1998 | Chisholm |
| 5,850,185 A | 12/1998 | Canty |
| 5,948,984 A | 9/1999 | Hedberg |
| 6,006,163 A | 12/1999 | Lichtenwalner |
| 6,192,758 B1 | 2/2001 | Huang |
| 6,240,783 B1 | 6/2001 | Mcgugin |
| 6,257,064 B1 | 7/2001 | Duron |
| 6,357,363 B1 | 3/2002 | Miltaru |
| 6,412,348 B1 | 7/2002 | Iemura |
| 6,484,381 B2 | 11/2002 | Cunningham |
| 6,501,550 B1 | 12/2002 | Mihaljov |
| 6,597,973 B1 | 7/2003 | Barich |
| 6,598,480 B2 | 7/2003 | Horiuchi |
| 6,637,266 B1 | 10/2003 | Froom |
| 6,718,270 B2 | 4/2004 | Horiuchi |
| 6,757,620 B1 | 6/2004 | Yoon |
| 6,779,404 B1 | 8/2004 | Brincker |
| 6,832,183 B1 | 12/2004 | Barich |
| 6,915,217 B2 | 7/2005 | Springer |
| 6,944,550 B2 | 9/2005 | Marchetti |
| 6,955,100 B1 | 10/2005 | Barich |
| 7,006,947 B2 | 2/2006 | Tryon |
| 7,024,343 B2 | 4/2006 | El-ratal |
| 7,194,326 B2 | 3/2007 | Cobb |
| 7,199,872 B2 | 4/2007 | Van Cranenbroeck |
| 7,228,240 B2 | 6/2007 | Duron |
| 7,352,446 B2 | 4/2008 | Bridges |
| 7,512,500 B2 | 3/2009 | Wilt |
| 7,546,224 B2 | 6/2009 | Campbell |
| 7,580,800 B1 | 8/2009 | Winter |
| 7,584,075 B2 | 9/2009 | Kim |
| 7,596,470 B2 | 9/2009 | Kim |
| 7,623,974 B2 | 11/2009 | Cipra |
| 7,637,166 B2 | 12/2009 | Hecht |
| 7,647,206 B2 | 1/2010 | Ford |
| 7,667,827 B2 | 2/2010 | Nelson |
| 7,668,692 B2 | 2/2010 | Tatom |
| 7,672,793 B2 | 3/2010 | Beard |
| 7,672,817 B2 | 3/2010 | Marsh |
| 7,681,468 B2 | 3/2010 | Veri |
| RE41,877 E | 10/2010 | Parker |
| 7,806,058 B2 | 10/2010 | Saxton |
| 7,819,008 B2 | 10/2010 | Winter |
| 7,856,334 B2 | 12/2010 | Parker |
| 7,895,015 B2 | 2/2011 | Parker |
| 7,975,622 B2 | 7/2011 | Dalrymple |
| 7,996,998 B2 | 8/2011 | Nakaniwa |
| 8,091,432 B2 | 1/2012 | Hecht |
| 8,176,800 B2 | 5/2012 | Cesare |
| 8,209,134 B2 | 6/2012 | Parker |
| 8,285,495 B2 | 10/2012 | Purekar |
| 8,510,061 B2 | 8/2013 | Grant |
| 8,688,408 B2 | 4/2014 | Marsh |
| 8,706,428 B1 | 4/2014 | Righi |
| 2006/0248954 A1 | 11/2006 | Snieder |
| 2008/0059086 A1 | 3/2008 | Duron |
| 2009/0171619 A1 | 7/2009 | Van Cranenbroeck |
| 2010/0179771 A1 | 7/2010 | Shim |
| 2010/0231919 A1 | 9/2010 | Schreiber |
| 2010/0238027 A1 | 9/2010 | Bastianini |
| 2011/0029276 A1 | 2/2011 | Cabral |
| 2012/0123981 A1 | 5/2012 | Graves |

OTHER PUBLICATIONS

Burge et al., "Use of a commercial laser tracker for optical alignment", Sep. 2007, Optical System Alignment and Tolerancing, SPIE vol. 6676.*

Saouma et al. "Statistical and 3D nonlinear finite element analysis of Schlegeis Dam", 2003, online http://civil.colorado.edu/~balajir/my-papers/souma-rajagopalan.pdf.*

Verification of High-Accuracy and contact measurement system using FSF Laser Optical Coordinate, Nov. 2007, 3rd INtl. Conf. on Struct. Health Monitoring.*

Benedikt Weber, "Rational Transmitting Boundaries for Time-Domain Analysis of Dam-Reservoir Interaction", 1994, vol. 205 of the series Institut für Baustatik and Konstruktion pp. 1-14.*

B. T. Wand, et al., "A single beam laser tracker as an alignment tool", SLAC-PUB-5847, Stanford, CA, 1992.

G. Gassner, et al., "Instrument tests with the new Leica AT401, SLAC-PUB-14300", Stanford, CA, 2011.

Public Law 108-426, 118 STAT. 2423-2429, 2004.

Osha Instruction Pub 8-1.5, Washington, DC, 1989.

"Inspecting rail tank cars", Inspection Trends, p. 15-17, summer 2007.

Federal hazmat law-an overview, US DOT Pipeline and Hazardous Materials Safety Administration, Washington, DC, 2008.

Virginia Tech, "Guidelines for the operation, assembly, repair, testing and inspection of hazardous material cargo tanks", US DOT Federal Motor Carrier Safety Administration, Washington, DC, 2009.

"Facts about propane", National Propane Gas Association, 2001.

"Railroad tank car nondestructive methods evaluation", DOT/FRA/ORD-01104, US DOT Federal Railroad Administration, Washington, Dc, 2004.

"ASME boiler and pressure vessel code", vol. V, table of contents, ASME 2007.

"Crashworthiness protection requirements for tank cars; detection and repair of cracks, pits, corrosion, lining flaws, thermal protection flaws and other defects of tank car tanks", US DOT Research and Special Programs Administration, 60 FR 49048-49083, 1995.

"Detection and repair of cracks, pits, corrosion, lining flaws, thermal protection flaws, and other defects of tank car tanks", US DOT Research and Special Programs Administration, 52 FR 46510-46511, 1987.

"Hazardous materials: improving the safety of railroad tank car transportation of hazardous materials", US DOT Pipeline and Hazardous Materials Safety Administration, 74 FR 1770-1802, 2009.

"Possible cause of reactor building explosions", All Things Nuclear, 2011.

Frank Von Ripple, "Second Chances: containment of a reactor meltdown", Bulletin of the Atomic Scientists, 2011.

"Five year strategic plan for railroad research, development, and demonstrations"; Section 4.8 hazardous materials transportation, US DOT Federal Railroad Administration, Washington, DC, 2002.

"Ten years of incident reports underscore human error as primary cause of accidents", p. 10-15, National Board Bulletin, 2002.

"Proposed Rule: Railroad tank car safety standards", US DOT Federal Railroad Administration, Washington, DC, 2008.

Frank Von Hippel, "From the Bulletin Archives: Containment of a reactor meltdown", reprint of 1982 article, Bulletin of the Atomic Scientists, 2011.

"Electronic total station speeds survey operations", Hewlett_Packard Journal, Apr. 1976.

"A fully integrated, microprocessor-controlled total station", Hewlett-Packard Journal, vol. 31, No. 9, 1980.

(56) References Cited

OTHER PUBLICATIONS

"Mechanical design constraints for a total station", Hewlett-Packard Journal, vol. 31, No. 9, 1980.
"A compact optical system for portable distance and angle measurements", Hewlett-Packard Journal, vol. 31, No. 9, 1980.
"An approach to large-scale non-contact coordinate measurements", Hewlett-Packard Journal, vol. 31, No. 9, 1980.
"Interfacing the 3820A via the HP-IB", Hewlett-Packard Journal, vol. 31, No. 9, 1980.
"Electronic distance measurement for industrial and scientific applications", Hewlett-Packard Journal, vol. 31, No. 6, 1980.
"Industrial distance meter applications", Hewlett-Packard Journal, vol. 31, No. 6, 1980.
"Rupture of a railroad tank car containing hazardous waste, Freeport, Texas, Sep. 13, 2002", NTSB/HZM-04/02, National Transportation Safety Board, Washington, DC, 2004.
"Rupture of a railroad tank car containing hazardous waste near Clymers, Indiana, Feb. 18, 1999", NTSB/HZM-01/01, National Transportation Safety Board, Washington, DC, 2001.
"DOT requires stronger railroad hazmat tank cars to improve crashworthiness", DOT 05-09, USDOT Office of Public Affairs, Washington, DC, 2009.
"Derailment of Canadian Pacific Railway freight train 292-16 and subsequent release of anhydrous ammonia near Minot, North Dakota, Jan. 18, 2002", NTSB/RAR-04/01, National Transportation Safety Board, Washington, DC, 2004.
"Collision of Union Pacific Railroad train MHOTU-23 with BNSF Railway Company train MEAP-TUL-126-D with subsequent derailment and hazardous materials release, Macdona, Texas Jun. 28, 2004", NTSB/RAR-06103, National Transportation Safety Board, Washington, DC, 2006.
"Collision of Norfolk Southern freight train 192 with standing Norfolk Southern local train P22 with subsequent hazardous materials release at Graniteville, South Carolina, Jan. 6, 2005", NTSB/RAR-05/04, National Transportation Safety Board, Washington, DC, 2005.
"Editor's Desk: the first total station?", Professional Surveyor Magazine, Apr. 2002.
New tracker "X" targets 3-D measurement extremes, FARO, 2006.
"Detection and repair of cracks, pits, corrosion, lining flaws and other defects of tank car tanks", 58 FR 48485-48501, US DOT Research and Special Programs Administration, Washington, DC, 1993.
Robert Ruland, "The Chesapeake Laser Tracker in industrial metrology", Proc. Third Int. Workshop on accelerator alignment, p. I/101-118, Annecy, 1993.
Ryuhei Sugahara, et al., "Performance test of a laser tracker", Smart 310, p. III/261-269, Proc. 4th. International Workshop on Accelerator Alignment (IWAA 1995), Tsukuba, Japan, 1995.

"Aloha Airlines, Flight 243 Boeing 737-200, N73711, near Maui, Hawaii, Apr. 28, 1988", NTSB/AAR-89/03, National Transportation Safety Board, Washington, DC, 1989.
U.S. Pat. No. 7,276,718, Holler (withdrawn).
The Surveying Handbook, Brinker and Minnick, section 5-11 "Total-Station Instruments", pp. 77-79, second edition, Chapman & Hall, 1995.
Electronic Distance Measurement, J. M. Rueger, Chapter 1 "History", pp. 1-2, third edition, Springer-Verlag, 1990.
"Nuclear Power Plants, World-Wide", European Nuclear Society, 2012.
Appendix J to Part 50-Primary Reactor Containment Leakage Testing for Water-Cooled Power Reactors, US Nuclear Regulatory Commission, 2012.
Dave Meier's HP Laser Interferometry Evolution Page, http://www.n4mw.com/hp5526/hple.htm, recovered Jun. 13, 2012.
Hewlett Packard 1971 catalog supplement, "Laser Interferometer Model 5525A", p. 31.
Assessment and Management of Ageing of Major Nuclear Power Plant Components Important to Safety: Concrete Containment Buildings, IAEA-TECDOC-1025, International Atomic Energy Agency, Vienna, 1998.
Overpressurization Test of 1:4 Scale Prestressed Concrete Containment Vessel Model, NUREG/CR-6810, SAND2003-0840P, Sandia National Laboratories, Albuquerque, 2003.
Demonstrating Structural Adequacy of Nuclear Power Plant Containment Structures for Beyond Design-Basis Pressure Loadings, BNL-91336-2010 CP, Brookhaven National Laboratory, Upton, NY, 2010.
Condition Assessment of Concrete Structures at Nuclear Power Plants by State of the Art Non-destructive Testing, O. Klinghoffer, et al., EPJ Web of Conferences 12, 03002 (2011).
Quantitative Nondestructive Testing of Railroad Tank Cars Using the Probability of Detection Evaluation Approach, DOT/FRA/ORD-09110, Federal Railroad Administration Office of Research and Development, Washington, 2009.
New Regulations on Railroad Bridge Safety: Opportunities and Challenges for Railroad Bridge Monitoring, Fernando Moreu et al., Sensors and Smart Structures Technologies for Civil, Mechanical, and Aerospace Systems 2012, SPIE vol. 8345, paper 834540, May 9, 2012.
Non-Contact Bridge Deflection Measurement: Application of Laser Technology, Upul Attanayake et al., Proceedings of the International Conference Structural Engineering Construction and Management 2011, ICSEM 2011, Peradeniya, Sri Lanka, 2011.
Structural Health Monitoring Method for Curved Concrete Bridge Box Girders, Branko Glišić, et al., Sensors and Smart Structures Technologies for Civil, Mechanical, and Aerospace Systems 2008, SPIE vol. 6932, paper 693204, 2008.

\* cited by examiner

US 9,354,043 B2

METHODS FOR MEASURING AND MODELING THE STRUCTURAL HEALTH OF PRESSURE VESSELS BASED ON ELECTRONIC DISTANCE MEASUREMENTS

CROSS-REFERENCE TO RELATED APPLICATIONS

This application is a continuation-in-part of U.S. patent application Ser. No. 12/973,842 filed Dec. 20, 2010, which is a continuation-in-part of U.S. Pat. No. 7,895,015 filed Dec. 4, 2008, the benefits of both of which are claimed and both of which are incorporated by reference herein.

FIELD OF INVENTION

Methods are disclosed wherein the structural health of large pressure vessels, including boilers, receivers, nuclear reactor containment structures, storage tanks, tank trucks, railway tank cars, ships, buoyant structures, reservoirs, vacuum chambers, aircraft, spacecraft, and the like, is determined based on electronic distance measurements. Electronic distance measurements are also used to verify structural models, such as finite element models.

BACKGROUND OF THE INVENTION

Historical Overview of Civil Structural Failures

Bridge Failures

On Aug. 1, 2007, the I-35W bridge over the Mississippi River in Minneapolis, Minn. experienced a catastrophic failure. The National Transportation Safety Board (NTSB) concluded in press release SB-08-53, incorporated by reference herein, that the probable cause of the collapse was the inadequate load capacity, due to a design error by Sverdrup & Parcel and Associates, Inc., of the gusset plates at the U10 nodes, which failed under a combination of (1) substantial increases in weight of the bridge, which resulted from previous modifications and (2) the traffic and concentrated construction loads on the bridge on the day of the accident.

On Apr. 1, 1989 the US 51 bridge over the Hatchie River near Covington, Tenn. experienced a catastrophic failure. The NTSB concluded in Highway Accident Report HAR-90-1, incorporated by reference herein, that the probable cause was the northbound migration of the main river channel which the Tennessee Department of Transportation failed to evaluate and correct. Contributing to the severity of the accident was a lack of redundancy in the design of the bridge spans.

On Apr. 5, 1987 the 1-90 bridge over the Schoharie Creek near Amsterdam, N.Y., experienced a catastrophic failure. The NTSB concluded in Highway Accident Report HAR-88-02, incorporated by reference herein, that the-probable cause of the collapse of the Schoharie Creek Bridge was the failure of the New York State Thruway Authority to maintain adequate riprap around the bridge piers, which led to severe erosion in the soil beneath the spread footings. Contributing to the accident were ambiguous plans and specifications used for construction of the bridge, an inadequate NYSTA bridge inspection program, and inadequate oversight by the New York State Department of Transportation and the Federal Highway Administration. Contributing to the severity of the accident was a lack of structural redundancy in the bridge.

On Jun. 28, 1983, the I-95E bridge over the Mianus River in Greenwich Conn. experienced a catastrophic failure. The NTSB concluded in Highway Accident Report HAR-84-3, incorporated by reference herein, Sometime before the collapse of the suspended span, the Inside hanger in the southeast corner of the span came off of the inside end of the lower pin. This action shifted the entire weight of the southeast corner of the span onto the outside hanger. The outside hanger gradually worked its way farther outward on the pin, and over a period of time, a fatigue crack developed in the top outside end of the upper pin. The shoulder of the pin fractured off, the pin and hanger assembly failed, and the span collapsed into the river.

On Dec. 15, 1967, the US 35 bridge over the Ohio River in Point Pleasant, W. Va. experienced a catastrophic failure. The NTSB concluded in Highway Accident Report HAR-71-1, incorporated by reference herein, that the cause of the bridge collapse was the cleavage fracture in the lower limb of the eye of eyebar 330 at joint C13N of the north eyebar suspension chain in the Ohio side span. The fracture was caused by the development of a critical size flaw over the 40-year life of the structure as the result of the joint action of stress corrosion and corrosion fatigue.

Other Civil Structural Failures

Catastrophic failures of cranes are much more common than bridges. Investigations are conducted by the U.S. Department of Labor Occupational Safety & Health Administration (OSHA). Unfortunately, the OSHA Accident Investigation Reports are not easily accessible, but from news reports the following crane accidents occurred recently.

On Jul. 18, 2008, a crane collapsed in Houston, Tex. at an oil refinery. On May 31, 2008, a crane collapsed at the Black Thunder Mine in northeast Wyoming. On May 30, 2008, a crane collapsed in New York at the corner of 91st Street and First Avenue. On Mar. 15, 2008 a crane collapsed in New York at the corner of 51st Street between Second and First Avenues.

According to Congressional Research Service report RL34658 *Worker Safety in the Construction Industry: The Crane and Derrick Standard*, updated Nov. 21, 2008, and incorporated by reference, there were 66 fatal injuries involving cranes in 2007; 69 in 2006; 83 in 2005; 85 in 2004; and 61 in 2003.

Railroad bridge failures occurred following flooding in Cedar Rapids on Jun. 12, 2008 and in Columbus Junction, Iowa on Jun. 24, 2008. In both cases, the bridges collapsed into the river with trains on the bridges.

On Nov. 15, 1988 the National Radio Astronomy Observatory 300-Foot Radio Telescope at Green Bank, W. Va. collapsed while observing. Prior to the collapse, it had been noted that the pointing had changed. Extensive visual inspections by maintenance mechanics climbing on the telescope earlier in the day, prompted by the pointing change, failed to identify a gusset plate which was subsequently identified as the probable cause of the collapse in a National Science Foundation Report. Without conclusive engineering data, the pointing change was dismissed as possibly due to electronic instrumentation problems.

Catastrophic failures during construction are all to frequent. For example: On Oct. 30, 2008, a parking garage under construction collapsed in Atlantic City, N.J. On Oct. 27, 2008, a bridge under construction in Nampa, Id. collapsed while concrete was being poured. On Feb. 10, 2008, a stadium under construction in Fort Worth, Tex. collapsed.

There have also been catastropic failures of standing buildings. On Jul. 7, 1981 suspended walkways in the Kansas City Hyatt Regency Hotel collapsed killing 114 and injuring 200. On Jun. 4, 1979 the Kemper Arena roof collapsed in 70 mph wind and heavy rain. On Jan. 18, 1978 the Hartford Civic Center roof collapsed due to snow loading.

Clearly there is a need in the art for additional Structural Health Monitoring measures to prevent the loss of life and property.

Preventative Measures for Civil Structural Failures

Bridge Inspection

In the United States, Highway bridge inspection is under the Department of Transportation Federal Highway Administration and Title 23 of the Code of Federal Regulations (CFR) Part 650—Bridges, Structures, and Hydraulics. Specifically, 23 CFR Part 650 Subpart C—National Bridge Inspection Standards, the index of which is incorporated by reference, specifies the inspection frequency, inspection procedures, and reference manuals.

The American Association of State Highway and Transportation Officials (AASHTO) provides additional guidance for bridge inspections through publications such as the Manual for Bridge Evaluation. It was noted in the I-35W investigation that AASHTO guidance used by states to perform bridge inspections does not include gusset plates as a CoRe element. Moreover, it had been observed that one of the gusset plates in question had actually been observed to be bowed in the prior inspections, but was not identified as a problem.

Railroad bridge inspection is under the Department of Transportation Federal Railroad Administration and Title 49 of the Code of Federal Regulations (CFR) Part 237—Bridges Safety Standards. The American Railroad Engineering and Maintenance-of-Way Association (AREMA) develops industry standards for inspection and maintenance of railway bridges.

Crane Inspection

Crane inspection is under the Occupational Safety and Health Administration (OSHA) and Title 29 of the Code of Federal Regulations (CFR) Subpart N—Cranes, Derricks, Hoists, Elevators, and Conveyors. Section 1926.550 covers Cranes and Derricks in under eight pages. The spirit of the regulations is captured in subsection (a) paragraph (1)

(a) General Requirements. (1) The employer shall comply with the manufacturer's specifications and limitations applicable to the operation of any and all cranes and derricks. Where manufacturer's specifications are not available, the limitations assigned to the equipment shall be based on the determinations of a qualified engineer competent in this field and such determination will be appropriately documented and recorded. Attachments used with cranes shall not exceed the capacity, rating, or scope recommended by the manufacturer.

Academic Research in Civil Structural Health Monitoring

Structural Health Monitoring is a relatively new field of formal study. The 1st International Workshop on Structural Health Monitoring was held in 1997, with additional workshops and Proceedings published every 2 years thereafter. The 7th International Workshop on Structural Health Monitoring will be held Sep. 9-11, 2009 at Stanford University. In the call for papers, incorporated by reference herein, under the heading *Sensors and Actuator Development*, papers are requested for; integrated sensors, wireless sensors, "smart" sensors, fiber optics, piezoelectrics, shape memory, alloys/polymers, MEMS sensors and micro-actuators, nano-sensors, etc.

SPIE has sponsored a number of conferences on Smart Structures. A search of the SPIE Proceedings produces 194 published Proceedings starting with Volume 0986 in 1988, a listing of which is incorporated by reference herein. SPIE will hold Smart Structures/NDE Mar. 8-12, 2009 in San Diego. The Program will include 10 sessions including 7292: Sensors and Smart Structures for Civil, Mechanical, and Aerospace Systems 7294: Nondestructive Characterization of Composite Materials, Aerospace Engineering, Civil Infrastructure, and Homeland Security III 7295: Health Monitoring of Structural and Biological Systems III the program listings of which are incorporated by reference herein, from which it will be understood that the topics of the papers are similar to the International Workshop on Structural Health Monitoring topics listed hereinabove.

Los Alamos National Laboratory has a project on Structural Health Monitoring, and has produced *A Review of Structural Health Monitoring Literature:* 1996-2001. The Web Page, Publication list, and Review is hereby incorporated by reference herein, from which it will also be understood that the topics of the papers are similar to the International Workshop on Structural Health Monitoring topics listed hereinabove.

The University of Illinois at Urbana Champaign established the Smart Structures Technology Laboratory in 2002, and has a large Graduate Program focusing on the areas of structural health monitoring, structural control, and smart sensor technologies.

Missouri Science and Technology University (formerly the University of Missouri-Rolla) operates the Center for Transportation Infrastructure and Safety. They have conducted a number of interesting studies of bridge deflections using a single total station. A summary listing of reports were cited in the parent application Ser. No. 12/973,842 and will not be repeated herein.

The Federal Highway Administration awarded a $25.5 million contract to the Rutgers Center for Advanced Infrastructure and Transportation establishing a Long-Term Bridge Performance Program (LTBPP).

Sage Journals Online publishes Structural Health Monitoring, An International Journal, with Volume 1 published in 2002. Edited by Fu-Kuo Chang of Stanford University, the web link and description is incorporated by reference herein. Yet again, the topics of the papers are similar to the International Workshop on Structural Health Monitoring topics listed hereinabove.

Books are beginning to be published on the subject. Useful references include *Structural Condition Assessment*, Robert T. Ratay, Wiley, 2005; and *Health Monitoring of Bridges*, Helmut Wenzel, Wiley, 2009.

A review of the aforementioned bibliographic sources presents one with a clear understanding of the prior art in the academic community at the time of the invention. In particular, the measurement techniques tend to concentrate on either localized strain measurements, vibrational analysis, localized movements of such things as joints, or wireless sensor technology. Moreover, measurements are directed toward measuring the expected performance of a healthy structure. For example, where LVDT transducers are placed to measure deflections, they are typically placed in the direction of the maximum expected deflection. However, in the case of a defective structure, detection of unexpected motions would provide even more valuable information.

The concentration of research into such a closed set of fields is possibly due in part to the emphasis of the National Science Foundation (NSF) by the Strategic Civil Infrastructure Systems Research Program, developed in 1993, as described by Liu and Tomizuka in *Vision and Strategy for Sensors and Smart Structures Technology Research*, incorporated by reference herein, i.e., the research follows the funding. It is also possibly due to the historic development of large-scale metrology around manufacturing, which may not attract the attention of structural engineers.

Historical Overview of Pressure Vessel Structural Failures

Electronic Distance Measurement instrumentation can also be used to measure the structural health of large pressure vessels, including boilers, receivers, nuclear reactor containment structures, tank trucks, railway tank cars, storage tanks, ships, buoyant devices, reservoirs, vacuum chambers, aircraft, spacecraft, and the like. As used hereinbelow, a pressure vessel will be understood to include any enclosed or open pressure vessel or container which is structured to support the forces of a differential pressure between two sides of a boundary. The differential pressure may be generated by the static weight of a material, compression, vapor pressure of a liquid, heat, vacuum, etc. The pressure may be higher internally, as in the case of a boiler or storage tank, or higher externally, as in the case of a vacuum chamber or ship hull.

Nuclear Power Plant Containment Buildings

From the outset of commercial nuclear power plant design, it was recognized that there is a need to provide a primary containment structure to contain radioactive material in the event of an accident. U.S. Pat. Nos. 3,865,688; 4,050,983; and 4,473,528 to Kleimola: U.S. Pat. No. 4,045,289 to Seidensticker et al.: U.S. Pat. No. 4,080,256 to Braun: and U.S. Pat. No. 4,927,596 to Minnick, all six of which are incorporated by reference herein, provide a good overview of containment structures for boiling water reactors (BWR) and pressurized water reactors (PWR). A primary concern, and the subject of many studies, has been a loss of coolant to the reactor core.

On Mar. 11, 2011, a magnitude 9.0 earthquake off the coast of Tohoku triggered a tsunami which disrupted power at the Tokyo Electric Power Company (TEPCO) Fukushima I (Fukushima dai-ichi) Nuclear Power Plant, in the Fukushima Prefecture, Japan. At the time of the earthquake, BWR Units 1-3 were operating and Units 4-6 were out of service. Following the earthquake, Units 1-3 automatically shut down. Site power delivered by the grid was lost as a result of the earthquake. Backup diesel generator power was later lost as a result of the tsunami. Backup battery power was soon exhausted, which resulting in loss of coolant to the reactors.

As explained in *Possible Cause of Reactor Building Explosions*, David Lochbaum, incorporated by reference herein, in a BWR, the reactor pressure vessel is enclosed within a relatively small primary containment structure (as compared to a PWR). Due to the loss of coolant, and subsequent high temperature and pressure of the reactor vessel, steam was relieved from the reactor vessel into the primary containment structure. As explained by Lochbaum, a loss of coolant accident can produce hydrogen in addition to steam. In the case of the Fukushima accident, there were explosions outside the primary containment structure—which indicate that the primary containment structures failed to contain the pressure of the vented steam and hydrogen. The Unit 1 building exploded on March 12, the Unit 3 building exploded on March 14, and the Unit 2 building exploded on March 15, i.e., three out of three primary containment structures failed to contain the steam and hydrogen in a loss of coolant accident.

Lochbaum makes a good argument that the drywell flange seal probably failed at around 62 psi. This problem was outlined in *Containment of a reactor meltdown*, Jan Beyea and Frank von Hippel, incorporated by reference herein, which was originally published September 1982 and republished March 2011. The authors state;

If for any reason the emergency core cooling system were not effective and a core meltdown occurred, the build-up of internal pressure in a sealed reactor containment building could rupture it within a matter of hours. The threat would come from steam, hydrogen and other gases.

Frank von Hippel published another article *Second chances: Containment of a reactor meltdown* in March 2011, incorporated by reference herein, which used the Fukushima I as an example.

According to the European Nuclear Society article *Nuclear power plants, world-wide*, incorporated by reference herein, as of Mar. 30, 2012, there are 436 operating nuclear power plants, with 104 in the US. In light of the Fukushima I accident, and the failure of all three primary containment structures, there is sure to be a renewed emphasis on ways to assure integrity of the primary containment structures.

In the US, nuclear power plants are regulated under Title 10 of the Code of Federal Regulations, 10 CFR. In particular, 10 CFR Appendix J to Part 50—Primary Reactor Containment Leakage Testing for Water-Cooled Power Reactors, incorporated by reference herein, specifies the testing regulations for primary containment structures. The testing methods basically call for pressurizing the building to the design pressure and checking that the pressure holds for a predetermined time after closing the valve to the pressure source. Leaks are found by using standard soap bubble solution and visual inspections, i.e., much like checking a tire.

Boilers and Unfired Pressure Vessels

The National Board of Boiler and Pressure Vessel Inspectors maintains a database of boiler and pressure vessel incident statistics. A report published in the Summer 2002 issue of the National Board Bulletin, incorporated by reference herein, compiled incident data between 1992 and 2001. Over the ten year period, there were; 127 fatalities, 720 injuries, and 23,338 accidents. Of the fatalities; 64 were killed by unfired pressure vessels, 44 by power boilers, 14 by water-heating boilers, and 5 by steam-heating boilers. Of the injuries; 289 were due to unfired pressure vessels, 250 due to power boilers, 92 due to water-heating boilers, and 89 due to steam-heating boilers. Of the accidents; 9,588 were due to steam-heating boilers, 6,928 due to water-heating boilers, 4,311 due to power boilers, and 2,511 due to unfired pressure vessels. Note that the fatality and injury rate per accident is much higher for unfired pressure vessels than the other classifications.

In the US, general use pressure vessels are regulated by the Occupational Safety and Health Administration (OSHA), Department of Labor, under Title 29 of the Code of Federal Regulations Part 1910, i.e., 29 CFR 1910. In particular; Subpart H covers hazardous materials, and subpart M covers compressed gas and compressed air equipment.

OSHA publication 8-1.5, GUIDELINES FOR PRESSURE VESSEL ASSESSMENT, 1989, incorporate by reference herein, provides a good overview of problems experienced by pressure vessels and prior art inspection methods. Section 5.0 Inspection Methods and Implementation, provides a good overview of conventional nondestructive examination (NDE) methods and cites the role of organizations such as; the American Society of Mechanical Engineers (ASME) Boiler and Pressure Vessel Code (BPVC), the American Petroleum Institute (API) Standards, the National Board of Boiler and Pressure Vessel Inspectors-National Board Inspection Code (NBIC), and the American Society for Nondestructive Testing (ASNT) Recommended Practice. Section V of the ASME BPVC covers Nondestructive Examination, the table of contents of which is incorporated by reference herein.

Transportation of Hazardous Materials

In the US, transportation of hazardous materials is subject to the Federal Hazardous Materials Transportation Law under Title 49 of the United States Code, Chapter 51, i.e., 49 U.S.C. 5101 et seq. and administered by the Department of Transportation (DOT). A good overview is provided in the pamplet *Federal Hazardous Materials Transportation Law An Overview*, published by the DOT Pipeline and Hazardous Materials Safety Administration, incorporated by reference herein. Under §5103 (b)(1) the Secretary of Transportation is given authority to prescribe regulations. Under §5103(b)(1)(A)(iii) the regulations apply to a person who—

(iii) designs, manufactures, fabricates, inspects, marks, maintains, reconditions, repairs, or tests a package, container, or packaging component that is represented, marked, certified, or sold as qualified for use in transporting hazardous material in commerce;

which of course covers those involved in pressure vessels used in transportation.

Responsibilities are shared by the DOT Pipeline and Hazardous Materials Safety Administration (PHMSA), the DOT Federal Motor Carrier Safety Administration (FMCSA), the DOT Federal Railroad Administration (FRA), the DOT Research and Innovative Technology Administration (RITA), and others. Hazardous Materials Regulations (HMR) are covered under Title 49 of the Code of Federal Regulations Parts 171-180, i.e., 49 CFR 171-180. Transportation by highway is regulated under 49 CFR 350-399. Transportation by railroad is regulated under 49 CFR 200-268.

A good overview of the FMCSA regulations is found in a report by Virginia Tech, *Guidelines for the Operation, Assembly, Repair, Testing and Inspection of Hazardous Material Cargo Tanks*, incorporated by reference herein. In particular, section 4 covers Cargo Tank Repair. It cites the ASME BPVC Section XII—Rules for Construction and Continued Service of Transportation Tanks, and the National Board of Boiler and Pressure Vessel Inspectors NBIC for guidance.

Section 5 covers Test and Inspection Guidelines. Section 5.9 covers Requirements for Test and Inspection of Specification Cargo Tanks. Details of the six tests prescribed in 49 CFR 180.407 are given for; external visual inspection (V) §180.407(d), internal visual inspection (I) §180.407(e), lining test (L) §180.407(f), pressure retest (P) §180.407(g), leakage test (K) §180.407(h), and thickness test (T) §180.407 (i).

Statistics on the number of trucks regulated by the FMCSA are not readily available, but *Facts about Propane*, published by the National Propane Gas Association (NPGA), incorporated by reference herein, cites a fleet of 6,000 transport trucks (7,000-12,000 gallons), 36,500 bobtails (1,000-5,000 gallon delivery trucks), and 22,000 railway tank cars. The vapor pressure of propane is listed at 287 psig at 130° F.

Prior to the creation of the Pipeline and Hazardous Materials Safety Administration under Public Law 108-426 on Nov. 30, 2004, the DOT Research and Special Programs Administration (RSPA) handled hazardous materials. On Dec. 8, 1987, RSPA published an Advanced Notice of Proposed Rulemaking (ANPRM) in the Federal Register, 52 FR 46510, incorporated by reference herein. RSPA docket number HM-201 for Detection and Repair of Cracks, Pits, Corrosion, Lining Flaws, Thermal Protection Flaws, and Other Defects of Tank Car Tanks. The fleet affected by HM-201 is estimated by the FRA to be 240,000 railway tank cars. The opening paragraph of the advanced notice stated;

As a result of actions taken in response to an incident involving a tank car leaking ethylene oxide on Dec. 31, 1984, at North Little Rock, Ark., RSPA and FRA have identified a problem concerning tank cars with small cracks.

The advanced notice concluded with a request for comments on 5 questions, including;

3. What inspection techniques (e.g. ultrasonic, magnetic particle, acoustic emission, and radiographic) are appropriate to detect small cracks, pits, corrosion, lining flaws, thermal protection flaws, and other defects?

On Sep. 16, 1993, RSPA published a Notice of Proposed Rulemaking (NPRM) in the Federal Register, 58 FR 48485, incorporated by reference herein. The NPRM commented on 14 comments received in response to the 5 questions in the ANPRM. In addition, section A *Adequacy of Hydrostatic Test* is particularly interesting. The history of hydrostatic testing was tied to a legacy of riveted or forge welded construction. It went on to make a case that hydrostatic testing at 1.3 times the maximum allowable working pressure (MAWP) is limited with respect to detecting fatigue cracks in fusion welded tanks.

It recited an incident on Jan. 18, 1992 at Dragon, Miss. where a tank car loaded with liquified petroleum gas split apart at a circumferential weld seam as the train began to pull out of a siding. As a result, the National Transportation Safety Board subjected seven cars with known cracks to a hydrostatic test. None of the test showed any indication that a crack was present. It also recited an incident on Mar. 25, 1992 at Kettle Falls, Wash. in which a tank car failed on its first post-test loaded move.

Section A concluded with the statement;

Based on the ineffectiveness of hydrostatic test in detecting significant fatigue cracking in tank cars resulting from severe loadings, stress risers, and welding defects, RSPA and the FRA no longer consider the hydrostatic test part of the optimum way to qualify fusion welded tank cars for continued service.

On Sep. 21, 1995, RSPA published the Final Rule 60 FR 49047, incorporated by reference herein. The Final Rule for HM-201 was combined with docket number HM-175A *Crashworthiness Protection Requirements for Tank Cars*, with docket HM-201 starting on page 49058. The Final Rule commented on 31 comments received in response to the NPRM and concluded with amendments to 49 CFR §§171, 172, 173, 179, and 180.

In support of HM-201, the FRA Office of Research and Development contracted with the Transportation Technology Center, Inc. (TTCI) a subsidiary of the American Association of Railroads (AAR) to perform joint government/industry evaluation of possible replacement test/inspections for the presently prescribed hydrostatic test/visual inspection of tank cars. The Federal Railroad Administration Office of Research and Development published the research in report *Railroad Tank Car Nondestructive Methods Evaluation* in January 2002, incorporated by reference herein.

Subsection 3.3 covers Developing a Validation Methodology. Subsubsections cover: 3.3.1 Liquid Penetrant Test Method, 3.3.2 Magnetic Particle Test Method, 3.3.3 Radiographic Test Method, 3.3.4 Ultrasonic Test Method, 3.3.5 Visual Test Method, and 3.3.6 Acoustic Emission Test Method.

On Nov. 30, 2004, Congress created the Pipeline and Hazardous Materials Safety Administration in the DOT, under Public Law 108-426. Duties of the Research and Special Programs Administration were transferred to PHMSA. On Jan. 13, 2009, PHMSA published Final Rule for Docket FRA-2006-25169 *Hazardous Materials: Improving the Safety of Railroad Tank Car Transportation of Hazardous Materials*. The rules amend the Hazardous Materials Regulations under 49 CFR §§171, 172, 173, 174, and 179. In particular it deals with poison inhalation hazard (PIH) materials, also called toxic inhalation hazard (TIH) materials. The Final Rule recites three incidents involving PIH;

> In the last several years, rail tank cars have been breached in numerous accidents, resulting in large releases of hazardous materials. Of particular concern, three of these accidents involved PIH materials: (1) The Jan. 18, 2002, derailment of a Canadian Pacific (CP) train in Minot, N. Dak. which resulted in a release of anhydrous ammonia; (2) the Jun. 28, 2004 collision between trains operated by Union Pacific Railroad Company (UP) Burlington Northern and Santa Fe Railway Company (now known as BNSF Railway Company) in Macdona, Tex. involving a breach of a loaded tank car containing chlorine; and (3) the Jan. 6, 2005 collision between two Norfolk Southern Railway Company (NS) trains in Graniteville, S.C., also involving the catastrophic rupture of a loaded chlorine tank car. As noted in the NPRM, although none of these accidents was caused by the hazardous materials tank cars, the failure of the tank cars involved led to fatalities, injuries, evacuations, and property and environmental damage.

The NPRM proposed replacement of the entire fleet of tank cars used to transport PIH materials, estimated at 15,300 of the 240,000 tank cars in the fleet, within eight years of the effective date. The industry responded that it lacked the technological and engineering ability to manufacture tank cars meeting the proposed standards. The rule was changed to be an interim response based on current engineering judgements within the affected market sector. It is anticipated that additional regulatory proceedings will result as continuing government and private sector research and development are validated and the resulting technology is successfully implemented by industry.

Aircraft and Spacecraft

Pressurized aircraft and spacecraft are another embodiment of pressure vessels. On Apr. 18, 1988, Aloha Airlines flight 243 experienced an explosive decompression at 24,000 feet, near Kahului, Hi. According to the National Transportation Safety Board Aircraft Accident Report NTSB/AAR-89/03 executive summary, incorporated by reference herein, > The National Transportation Safety Board determines that the probable cause of this accident was the failure of the Aloha Airlines maintenance program to detect the presence of significant disbonding and fatigue damage which ultimately led to failure of the lap joint at 5-10 L and the separation of the fuselage upper lobe.

On Apr. 1, 2011 Southwest Airlines flight 812 experienced a 9 inch wide by 59 inch long rupture in the fuselage at 34,000 feet, near Yuma, Ariz. A final report for docket number DCA11MA039 has not yet been issued, but a press release on Apr. 25, 2011 stated, > Non-destructive eddy current inspections conducted around intact rivets on the removes skin section forward of the rupture revealed crack indications at nine rivet holes in the lower rivet row of the lap joint. To assess the condition of the intact rivets and the skin rivet holes, X-ray inspections were performed on the skin located forward of the rupture location. The inspection revealed gaps between the shank portions of several rivets and the corresponding rivet holes for many rivets associated with S-4L. Upon removing selected rivets, the holes in the upper and lower skin were found to be slightly offset relative to each other and many of the holes on the lower skin were out of round.

Aircraft are regulated under Title 49 of the United States Code 49 U.S.C. which authorizes the FAA to regulate air safety under 14 CFR. Subchapter C of 14 CFR sections 21-49 cover aircraft standards and 14 CFR 39.13 provides for the FAA to issue Airworthiness Directives (AD) as amendments to §39.13. On Apr. 5, 2011, in response to the flight 812 accident, the FFA issued AD #2011-08-51 which directed that a Boeing Alert Service Bulletin dated Apr. 4, 2011 be followed to conduct eddy current inspections of the lap joint stringers. While eddy current inspections could identify cracks, it is not clear how eddy current inspections could detect improper fitting holes between the upper and lower skin as described in the April 25 press release.

Shortcomings of the Prior Art

Vibrational analysis inherently integrates all components of the structure into a few vibrational measurements, e.g., a shift in loading anywhere in the structure, or a change in the mechanical properties of the structure, produces a change in vibrational modes. For example, if a bit of metal is filed off a tuning fork, the frequency will change. If any of the metal is anealed, the frequency will change. If the tuning fork corrodes, the frequency will change. The problem is that analysis of the data is very complex, and may not point to suspect areas for follow-up human inspection.

Strain measurements are localized measurements and therefore require a large number of transducers to map a civil structure. For example, typical strain gages are less than 1 inch in length and the sensitivity is along the direction of the wires. Moreover, bonding of the strain transducers to the structural elements may make retrofitting an existing structure, or replacement of embedded transducers, difficult. The incremental cost for additional measurement points is approximately linear with the number of points. The most significant problem is that analysis requires extrapolation of the localized measurements of a large number of transducers to model the structure.

Hydrostatic testing has been shown to be unreliable for detecting fatigue cracks in railroad tank cars. Visual inspections, ultrasonic, magnetic particle, acoustic emission, radiographic, leak, and other traditional nondestructive testing techniques are useful, but in need of additional techniques to augment conventional measurement capabilities.

Need Fulfilled by the Invention

Direct measurements of the coordinates of a structure at cardinal points which provide unambiguous indications as to the health of the structure are needed. This can be achieved by incorporating advances in Electronic Distance Measurement (EDM) to Structural Health Monitoring. A significant advantage is that the large capital investment for instrumentation and software is a one-time expense which can be shared over hundreds of structures, while the incremental cost for additional cardinal points on the structure is small.

The only known proposal of EDM using trilateration for Structural Health Monitoring is described in *Measurement Program for the Green Bank Telescope*, Hall et al, SPIE Conference on Advanced Technology MMW, Radio, and Terahertz Telescopes, Kona, Hi., March 1998, SPIE Vol. 3357, which is incorporated by reference herein. This proposal was not reduced to practice, and was limited to the specific case of a radio telescope rotating in azimuth and elevation. The project was abandoned in 2004, when the management of the National Radio Astronomy Observatory (NRAO) and an advisory committee decided it was not needed, and the necessary measurements could be obtained by astronomical pointing measurements made by the telescope, i.e., the methods traditionally used to point radio telescopes—including the collapsed 300 Foot Radio Telescope the $75 million Green Bank Telescope replaced.

As illustrated by the recited case histories, there is a long-felt but unresolved need to prevent civil structural failures in order to protect life and property. It would therefore be desirable and advantageous to address the problems of Structural Health Monitoring and to obviate shortcomings in the prior art by bringing the advantages afforded by modern Electronic Distance Measurement instrumentation to the problem.

BRIEF SUMMARY OF THE INVENTION

Electronic Distance Measurement is used for Structural Health Measurement of civil structures and pressure vessels. An architecture for making measurements and converting to (x, y, z) coordinates is described. Data analysis examples are described for a bridge, including applications to historic bridge collapses. An example of how a finite element model may be verified against experimental measurements is given. An example of how experimental measurements may be used to check characteristic behavior as an indicator of structural health is given. Examples of measurements for bridges, cranes, containment buildings, and railway tank cars are given.

DETAILED DESCRIPTION OF THE INVENTION

Electronic Distance Measurement

Figure 1:
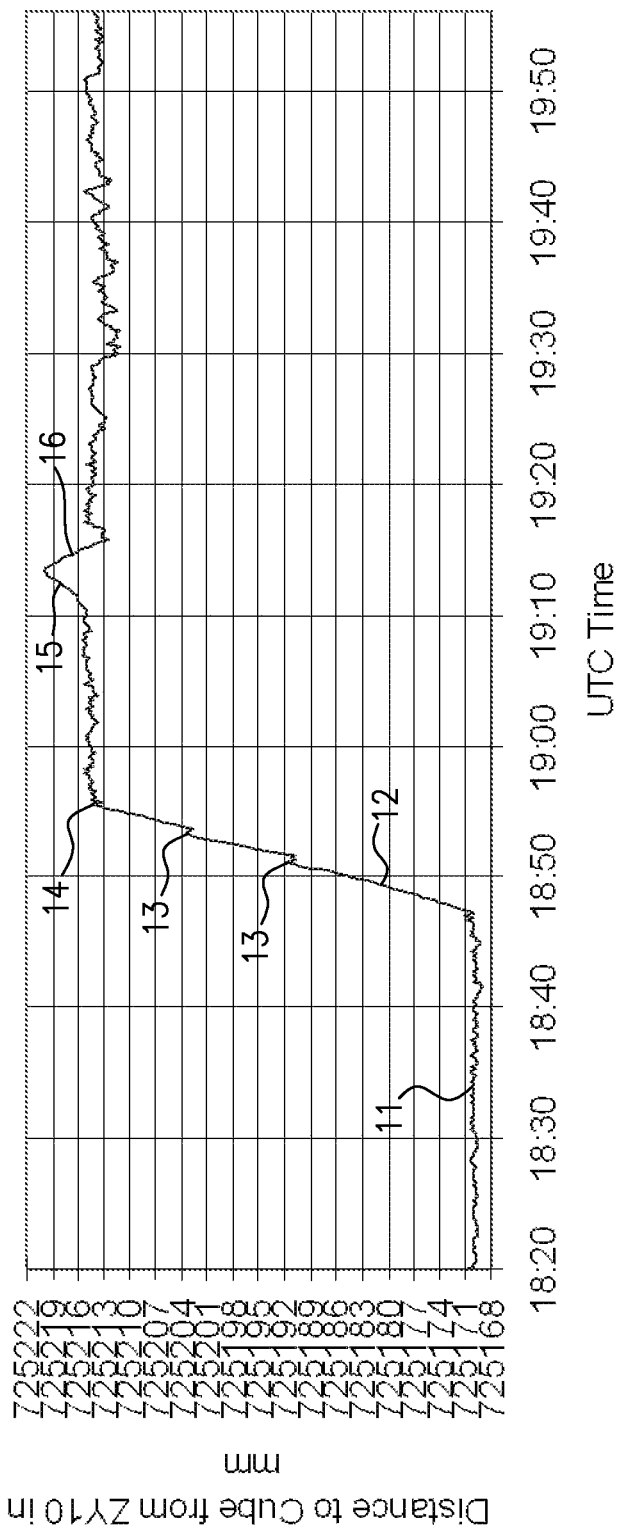
FIG. 1 is a plot of prior art EDM measurements of a crane deflections.

The most common surveying instrument used by Civil and Structural engineers is the Total Station. The early history of the introduction of the Total Station is not clear. Chapter 5 of *The Surveying Handbook*, second edition, Brinker and Minnick, 1995, credits Hewlett-Packard with inventing the name total station for the Model 3810A, which was introduced in the April 1976 edition of HEWLETT-PACKARD JOURNAL, incorporated by reference herein. This was disclosed by Hewlett-Packard Company in U.S. Pat. No. 4,113,381 to Epstein, as filed in 1976 and incorporated by reference herein.

Chapter 1 of *Electronic Distance Measurement*, third edition, Rüeger, 1990, incorporated by reference herein, cites the Zeiss Reg ELTA 14 as the first Total Station introduced in 1970, and the AGA Geodimeter 700 as the second in 1971. In an article in the April 2003 issue of Professional Surveyor Magazine, incorporated by reference herein, Marc Cheves recounts a claim by former employees of Zeiss and Geodimeter that both introduced the total station at the same show in 1971, i.e., the Zeiss Reg ELTA 14 and the AGA Geodimeter 700. Cheves goes on to say "My first experience with the term total station, (as was the experience of many other surveyors in the United States), was associated with Hewlett Packard."

As explained in Chapter 4 of *The Surveying Handbook*, prior to the total station, surveyors measured distance by steel or invar tapes, which required corrections for slope, temperature, catenary curve, and tension. Distances were also measured optically by stadia tacheometry. By measuring the angle subtended by a known length, such as a stadia rod or subtense bar, distance could be determined using a theodolite to measure angles. The total station combined distance and angle measurements into one instrument.

The total station incorporates electronic distance measurement with measurement of two angles, as well as automatic electronic compensation for mechanical level errors. Typical uncertainty is around 1 arc second for angles and 3 mm for distance under ideal conditions. Total stations operate at ranges up to several kilometers, with large target arrays. Measurements are made by a surveyor sighting through a telescope to measure the angles and pressing a button to initiate a distance measurement, which typically takes several seconds to complete. Beginning around the year 2000, total stations began being automated, and now totally automatic instruments with automatic tracking for angle measurements are available. Due to the nature of the applications for total stations, there has not been a driving need to reduce the distance error or increase the speed of measurement. Compared to the prior art of pulling measuring tapes, the speed and accuracy of even a modest performance total station is almost overkill for the construction industry. Few construction projects require distance acuracies less than 5 mm or measurement speeds faster than a few seconds. For reasons that will be discussed in detail hereinbelow, the uncertainty of single instrument measurements using angle measurements are still too large for structural health monitoring of many stiff structures, which undergo small deformations under load.

In a parallel path to the development of the Total Station for surveying, Hewlett-Packard introduced the HP 5525A laser interferometer in 1971. This quickly became the length standard for machine shops and metrology labs. A major limitation was that the retroreflector target had to be carefully controlled while moving from a starting point to an end point down a static laser beam in order to measure the differential distance. This was easy enough for machine movements and laboratory environments, but almost impossible across a shop floor or field. Typically, a temporary straight track had to be constructed and a trolly translated the retroreflector down the beam.

U.S. Pat. No. 4,457,625 ('625) to Greenleaf et al., filed in 1981; U.S. Pat. No. 4,621,926 ('926) to Merry et al., filed in 1985; U.S. Pat. No. 4,714,339 ('339) to Lau et al., filed in 1986; and U.S. Pat. No. 4,790,651 ('651) to Brown, et al., filed in 1987; all disclosed tracking laser interferometers that were developed under various US Government sponsored programs to develop higher accuracy three-dimensional measurement capabilities. Tracking laser interferometers incorporated a control system to automatically track a retroreflector by moving the beam to follow the retroreflector, which allowed an operator to simply carry the retroreflector between points. Operation and performance of an early instrument is described in Stanford Linear Accelerator Center publication SLAC-PUB-5847, incorporated by reference herein.

It will be understood by those skilled in the art that a laser interferometer inherently measures the phase of a light signal and is thus limited to integrating distances from a starting point to an end point to measure a differential length. There is no inherent "zero" reference for an interferometer. For that reason, laser trackers include a "home" location fixed to the instrument housing which is used to reference measurements to a reference point at the intersection of the azimuth and zenith axes. A significant advantage of the laser tracker is that the interferometer is fast, which allows the laser tracker to make dynamic measurements at over 1 kHz—in contrast with the total station which operates at fractions of a Hz.

Due to the metrology lab and interferometer heritage, laser trackers were developed for the most demanding dimensional metrology applications. Emphasis was placed on accuracy over working distance, since most applications were in machine shops, optics shops, metrology labs, scientific experiments, accelerators, etc. For the most part, total stations and laser trackers developed independently along parallel lines for different applications, i.e., total stations for longer range less accurate surveying and laser trackers for shorter range higher precision metrology.

In October 2004, FARO Technologies introduced the FARO X, a laser tracker architecture (without the interferometer) that adopted absolute distance measurement capabilities—like total stations—but retaining the emphasis on short range accuracy and fast measurement speed. Even though most laser trackers are no longer limited to tracking laser interferometers, the instruments are still called by the legacy name "trackers" to distinguish them from less accurate, and slower, total stations—which now also track targets in order to eliminate the operator at the instrument. Absolute distance measurement—unlike interferometers—enables the instrument to freely switch between targets as needed. This is a critical requirement for structural health monitoring applications.

Commercial laser tracker instruments are available from FARO Technologies, Inc., Lake Mary, Fla., Leica AG, Heerbrugg, Switzerland, and Automated Precision Inc. (API), Rockville, Md., that could (and most surely will) be adapted for the purpose of structural health monitoring. Laser trackers, using absolute distance measurement, have distance measurement accuracies of the order of 1 part per million, but suffer from the same inherent weakness in angle measurements as theodolites and total stations of around 1 arc second, or 5 parts per million—under ideal conditions.

To put 1 part per million in perspective, 1 ppm in 100 meters is 0.100 mm, 100 microns (μm), or 0.004 inches. This is the thickness of a sheet of standard 20 pound printer paper. The accuracy for differential measurements, such as the delta between two points, is typically around 10 μm or better. In contrast, the most common instrument used by a machinist in a machine shop for precision measurements is a micrometer—in fact the micrometer is the iconic symbol for high precision measurement. A typical micrometer has an accuracy of 0.000 050 inch, i.e., for a 1 inch micrometer, the accuracy is 50 parts per million. Stated another way, EDM measurements with an accuracy of 1 ppm for large-scale metrology measurements is proportionally 50 time more accurate than measurements made by a micrometer in a machine shop.

Such high accuracy presents practical problems for field calibration of these instruments, i.e., there are no better instruments to check them against. A practical test method which detects a number of common problems is disclosed in U.S. Pat. No. 7,856,334 to Parker, incorporated by reference herein.

Previously available commercial Laser trackers were limited in range to under 100 meters—although there is no inherent limitation that prevents them from being extended to several kilometers, as will be shown in experimental data hereinbelow and in the Figures. The model PSH97, described herein, made distance measurements at the 1 ppm level at distances over 1000 meters, and measurement speed of 1 kHz—although better results were obtained by integrating over around 100 ms, with the most significant improvement for integration over 17 ms (period of 60 Hz noise). In April 2010, Leica introduced the model AT401 laser tracker which has a range of 160 meters. Experimental test results for the AT401 are published in SLAC-PUB-14300, incorporated by reference herein. Where the FARO X adapted absolute distance measurement to a laser tracker architecture, the Leica AT401 adapted the accuracy of a laser tracker to the total station architecture. The distinction between so-called total stations and laser trackers is no longer clear.

The remaining advancement is to extend the range and adapt the instruments for dynamic multilateration, i.e., combine the accurate length measurement and speed of a laser tracker with the range of a total station and use three or more instruments in cooperation and time synchronization to obviate the angle measurement weakness of single instruments.

There has been a long development history of multilateration. The Greenleaf '625 and Merry '926 patents both used multilateration of laser interferometers in the early 1980s. Pitches et al. disclosed a Three-Dimensional Position Measuring Apparatus in U.S. Pat. No. 4,691,446 in 1987, incorporated by reference herein, which comprises a plurality of laser rangefinders measuring the distances to a plurality of corner cube reflectors. By trilateration, the coordinate of a target point may be determined. However, the '446 patent does not disclose the details of the laser rangefinders or coordinate system and it is not directed to Structural Health Monitoring.

In order to switch between a plurality of points, it is necessary to use an absolute distance measurement, or incorporate a priori knowledge of the approximate distance to a target within the ambiguity of the distance measurement. Payne et al. disclosed such a *Rangefinder with Fast Multiple Range Capability* in Rev. Sci. Instrum. 63(6), June 1992, and U.S. Pat. No. 5,455,670 ('670) Optical Electronic Distance Measuring Apparatus with Movable Mirror in 1995, both of which are incorporated by reference herein. The modulation of 1500 MHz results in an ambiguity of approximately 100 mm. For a quasi static structure, the location of a target will normally be known within an uncertainty of 50 mm, and thus there was no need to provide additional capabilities to resolve the uncertainty.

Note that the 20 custom designed and built instruments, the Model PSH97, did not incorporate tracking capability, since it was designed to switch between a plurality of quasi static targets. Pointing was achieved based on the a priori target coordinate, a finite element model of the structure, and instrument coordinate and orientation with minor adjustments made based on signal strength peaking by searching around the calculated instrument azimuth and elevation encoder readings.

The PSH97 instrument incorporates a six degrees of freedom Kelvin mount, which in combination with laboratory calibration of the instrument and field calibration of the mounting monuments provide for instrument replacement wherein a specific instrument placed on a specific monument can point to a coordinate by dead reckoning by loading a few calibration parameters into the control software.

In order to facilitate strong baseline measurements between instruments, the mirror mounting incorporates a retroreflector on the back side. A measurement between instruments is conducted by a first instrument turning its retroreflector toward a second instrument, and the second instrument measuring the distance to the first instrument. By correcting for the retroreflector offset and mounting, the distance between instruments is measured. The same distance is measured by the first instrument to the second instrument in the same manner. It will be recognized that instruments in a plane cannot determine the z coordinate by measuring between instruments. This is accomplished by a hydrostatic level as described in *Advances in hydrostatic leveling with the NPH6, and suggestions for further enhancements*, Parker, Radcliff, and Shelton, Precision Engineering, 29 (2005) 367-374, incorporated by reference herein.

U.S. Pat. No. 5,764,360 to Meier in 1998, incorporated by reference herein, discloses Electro-Optical Measuring Device for Absolute Distances which comprises the combination of absolute distance measurement with tracking.

U.S. Pat. No. 7,352,446 to Bridges and Hoffer in 2008, incorporated by reference herein, discloses an Absolute Distance Meter That Measures a Moving Retroreflector, which combines absolute distance while moving and tracking.

Other than the PSH97, there are no other known EDM instruments that incorporate a Kelvin mount or integral retroreflector to facilitate measurements between cooperating instruments. Moreover, the '670 patent teaches the use of plural instruments measuring plural targets—although it has yet to be fully realized for the intended purpose on the Green Bank Telescope, i.e., the '670 patent has not been fully reduced to practice at this time.

Large-scale Metrology

An excellent review of Large Scale Metrology can be found in *Large-Scale Metrology—An Update*, Estler et al., Annals of the CIRP, Vol. 51/2/2002, which is incorporated by reference herein. This series was updated by Peggs, et al., in *Recent developments in large-scale dimensional metrology*, Proceedings of the Institution of Mechanical Engineers, Part B; Journal of Engineering Manufacture 2009, review paper 571, pp. 571-595, incorporated by reference herein. In section 2.4, Estler discusses turbulence, whereby the noise of an angle measurement to a target at a distance L increases roughly as $L^{3/2}$. Particularly for long outdoor measurements, such as for a civil structure, this is a significant limitation for single tracking instruments, such as the '339, '360, and '446 instruments. This is explained in detail in U.S. Pat. No. 7,101,053 ('053) Multidirectional Retroreflectors to Parker in 2006, incorporated by reference herein, at column 3 line 60 through column 4 line 20. Note that '053 was reissued with broading claims as RE41877, which is incorporated by reference herein.

The '053 patent makes the argument that the best method to achieve strong measurements is by using a plurality of distance measurements and solving for a coordinate by multilateration, i.e., ignore the angle measurements in the adjustment. Moreover, '053 teaches a retroreflector architecture to eliminate the Abbe error for such a measurement.

Multilateration is well known in the art, and software such as STAR*NET V6 is available from Starplus Software, Oakland, Calif., to perform least squares adjustments.

It will be recognized by those skilled in the art that the speed of light through the atmosphere is dependent on temperature, humidity, and pressure; where temperature is the primary uncertainty. Correction methods are addressed in report GBT Archive L0680 *Methods for Correcting the Group Index of Refraction at the ppm Level for Outdoor Electronic Distance Measurements*, which is incorporated by reference. In addition to measuring temperature, humidity, and pressure and calculating the index of refraction, methods are disclosed to use fixed bench marks as refractometers and acoustic thermometry to measure the speed of sound—which is also dependent on temperature. Acoustic thermometry is described in GBT Memo 79 *The Feasibility of Acoustic Thermometry for Laser EDM Temperature Correction*, Parker, D. H., et. al. (7-92), which is incorporated by reference herein.

Example Electronic Distance Measurements for Large-scale Metrology

Example measurements made with the PSH97 instrument described hereinabove will illustrate the utility of EDM for Structural Health Monitoring.

GBT MEMO 160 *Laser Rangefinder Deflection Measurements of the GBT Derrick*, incorporated by reference herein, reports on measurements of the deflection of a derrick crane while lifting a 89 500 pound load from a distance of approximately 725 meters from the instrument. One of the figures is reproduced herein as FIG. 1. Note that prior to the time around 18:50 11 the load was hanging freely near the ground with the boom at approximately 45 degrees to the horizon. Starting around 18:50 12 the boom was raised with pauses to adjust the whip line 13 which slightly adjusted the angle of the load, and thus the center of gravity. When the boom reached approximately 75 degrees 14, the boom was swung right 15, and then the boom was lowered slightly 16.

Note that as the boom was raised 12-14, the derrick moved approximately 45 mm in the direction of the instrument due to the reduction in the moment on the 180 foot tall tower to which the derrick was mounted. Also note that other than the adjustments to the whip line 13, the movement of the tower 12-14 was a smooth function.

GBT Archive L0535, incorporated by reference herein, reports on measurements of a point on the Green Bank Telescope (GBT) which shows measurements from approximately 162 m. A figure is reproduced herein as FIG. 2 from which one will recognize that natural frequency vibrations 21 of approximately 60 microns 22 with a period of approximately 1.5 s 23 are clearly detected.

GBT Archive L0485, incorporated by reference herein, reports on measurements of a point on the GBT from approximately 84 meters. A figure is reproduced herein as FIG. 3 which shows the deflection of the telescope structure near the vertex as a tour group walked approximately 50 m out to the vertex starting 31 around 9:08, and starting to return 32 around 9:18. It will also be recognized that thermal changes 33 are also detectable.

These examples clearly show that EDM is capable of measuring distances, with a group refractive index correction, at around the 1 part per million range for absolute distance, i.e., the range accuracy of laser trackers is practical for much longer ranges than presently commercially available. There are no fundamental limitations preventing total stations from combining the long distance capabilities with the higher accuracy capabilities of the laser tracker. Moreover, dynamic measurements of differential changes in distance operate in the noise level of around 10 microns for outdoor measurements. It will be recognized that signal processing techniques may be used to reduce the noise for repeatable motions such as vibrational analysis, and the noise level will be lower for night measurements.

It will be recognized that even in the absence of atmospheric turbulence, there is a fundamental limitation in angle measurements. A telescope is diffraction limited by the Rayleigh criterion $$\sin(\theta) = 1.220 \frac{\lambda}{D} \qquad (1)$$

where θ is the angular resolution, λ is the wavelength of light, and D is the diameter of the telescope aperture. In order to measure angles within 1 part per million—even in a vacuum—the telescope optics would be required to be much larger than conventional total stations. It is clear that in order to obtain 3-D coordinates with the accuracy of EDM, it is necessary to use at least three range measuring instruments and calculate the coordinates by trilateration or using more than 3 instruments using multilateration.

Applications of Electronic Distance Measurement to Civil Structural Health Monitoring Consider a civil structure such as, but not limited to, a bridge or the like. Permanent retroreflectors, or permanent mounts for temporary retroreflectors, can easily and economically be installed at a plurality of locations of interest on the structure. A plurality of fixed bench mark locations fixed in the earth adjacent to the bridge provide a local reference coordinate system which could also be fixed to a global coordinate system, such as the National Geodetic Survey (NGS), by differential GPS observations in conjunction with reference NGS bench mark observations.

For the purpose of this discussion, assume any point on the bridge visible from 3 or more widely spaced locations on the ground can be known, by automated measurements, to an absolute coordinate with an absolute uncertainty of around 100 microns (0.004 inches), and the dynamic location can be know to an uncertainty of around 10 microns at a frequency of several Hertz. It will be understood that the absolute coordinates will be for the entire life of the structure and reference coordinate system.

Application to Recited Civil Structural Cases

Given such a capability, a number of applications will be recognized by those skilled in the art. For example, in the case of the I-35W bridge described hereinabove, a finite element model of the bridge would have predicted the deflections for the previous modifications to the bridge. By knowing the actual coordinates of points before and after the modifications, it would have been noted that the model was in error, i.e., the model of the joints was in error. At the time of the collapse, measurements before the contractor started and as work progressed would have identified that concentrated loading of material on the bridge was a problem.

In the case of the US 51 bridge described hereinabove, movement of the bridge due to migration of the main river channel would have been detected as a long term drift in coordinates of the bridge, changes in the deflections under load due to weakness in the foundations, or asymmetry in the deflections due to differences in the foundation of different columns.

In the case of the 1-90 bridge described hereinabove, changes in the coordinates of the bridge or asymmetric deflections over solid vs weak foundations would have identified a problem.

In the case of the I-95E bridge described hereinabove, changes in the coordinates of the bridge would have identified the problem at the outset.

In the case of the US 35 bridge described hereinabove, it is not clear if the corrosion resulted in changes in coordinates of points leading up to the single point catastrophic failure. A nonlinear response could be detected by heavily loading the structure by closing the bridge and placing tanks on the bridge which could be filled with metered water to calculate the dead load while observing the deflections for nonlinearities.

In the Other Civil Structural Failures recited hereinabove, there are insufficient details from news reports to know exactly how the failures occurred. Unfortunately, such failures are so commonplace that extensive investigations and official reports are not published. However, it is likely that some could have been prevented by Structural Health Monitoring, including coordinate measurements.

Other Civil Structural Applications

New bridges and buildings undergo extensive Finite Element Model (FEM) analysis in the design phase. However, a number of assumptions are made—just as the assumption was made that the gusset plates in the I-35W bridge were more than adequate and were not checked by calculation, a modern finite element model may approximate the joint as a pin connection and not bother with the details of the gusset.

Finite Element Models can predict deflections and natural frequency modes of a structure in stages as it is being built. By actually measuring the deflections and vibrational modes as the structure is built, errors in the model can be detected when the predicted coordinates do not match the experimental data. Moreover, by providing the designer with feedback, confidence will be gained in the design. It will be understood that movements and deflections are resolved into three axes (x, y, z).

It will be recognized that in the absence of a Finite Element Model, there are general characteristics indicative of a healthy structure. Deviations from these general characteristics will be recognized by those skilled in the art as a harbinger to a structural health problem. For example:

1. Deflections should be linear, i.e., they should follow Hooke's law f=kx where f is force, k is a spring constant, and x is the displacement. For example, the deflection of a bridge deck under a 2 ton load should be twice the deflection under a 1 ton load. The deflections of a tower crane should be linear as the load is translated out the arm.

2. Cracks are one source of nonlinearity that will be identifiable. For example, a crack is stiff in compression and weak in tension. Loading that cycles a cracked element between tension and compression shows strong nonlinearities in the movements of points on the structure. For example, a tower crane with no load typically has a net moment produced by the counterweight. This results in elements of the tower on one side being in tension and elements on the opposite side being in compression. By rotating in azimuth, the loads reverse. A structurally sound tower should produce symmetric deflections as a function of azimuth. However, a cracked weld or member will exhibit different properties for compression and tension.

3. Elements operating near their elastic limit will produce nonlinearities in the movements of points.
4. There should be no hysteresis, e.g., a structure should return to the initial position after a load is removed. By measuring a plurality of points, such things as slipping joints are detectable.
5. Movements should be a smooth function. For example, as the temperature goes through a diurnal cycle, a bridge will expand and contract. Typically one end is supported on a bearing to accommodate these movements. If the bearing is not functioning properly, excessive forces may develop until they reach a point of producing slip. This will be easily detectable by accurate coordinate measurements.
6. Plots of the deflections in (x,y,z) of a cardinal point as a vehicle travels over a bridge at uniform velocity should be capable of being expressed as the first few harmonics in a harmonic series, i.e., there should not be any sharp bumps in the plots, and there should be no hysteresis.
7. Long-term creep should be well understood, such as concrete curing or seasonal moisture absorption.
8. Changes in the damping coefficient, or Q, of the structure should be well understood, such as changes in weight due to rain.

It will also be recognized that even in the absence of a Finite Element Model, symmetry of a bridge may be exploited in the analysis. For example, most bridges have left-right symmetry about the direction of traffic and one would expect the deflections of a test load on the left side to produce symmetric deflections for the same load applied to the right side. There can also be symmetry between ends, spans, support columns, and even between other bridges of similar design. Prestress or post-tensioned tendon failure could be detected by asymmetry. Internal corrosion of concrete embedded rebar could be detectable—particularly as a long term drift over years.

It is often the case that the highest loads may be experienced during construction. For example, a load may be cantilevered out producing loading on columns that they will not experience under normal operating conditions. By measuring a plurality of points routinely, problem areas can be detected when experimental data does not match predictions, or something creeps.

The integrity of a bridge may come into question as a result of an accident, flood, earthquake, etc. For example, an accident producing a fire on, or under, a bridge my weaken structural members. Bridges over waterways are often hit by ships, flood debris, ice, etc. Simply by knowing that cardinal points on the bridge are not within the seasonal limits could quickly identify problem areas.

Implementation of a Structural Health Monitoring Program for Bridges

Figure 4:
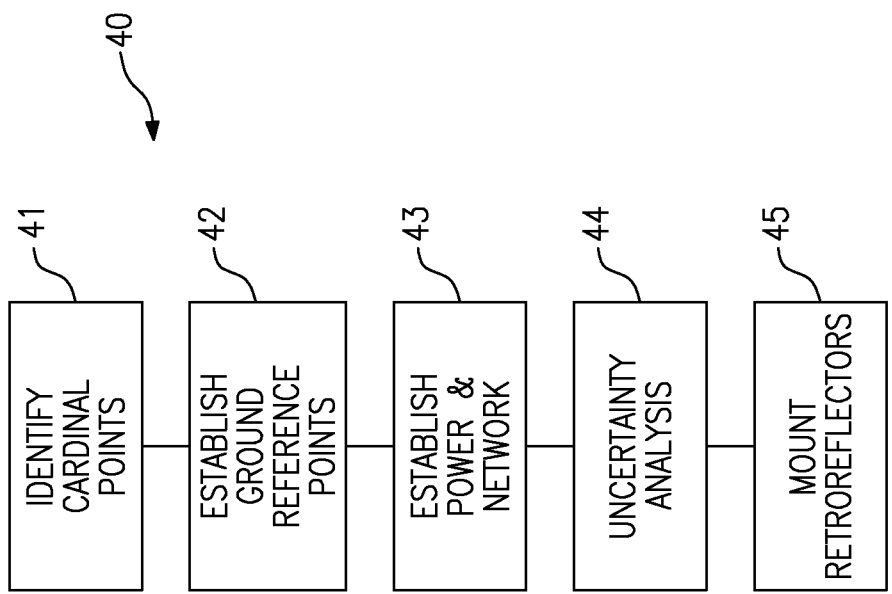
FIG. 4 is a flow chart of the structure preparation for the preferred embodiment.
Figure 5:
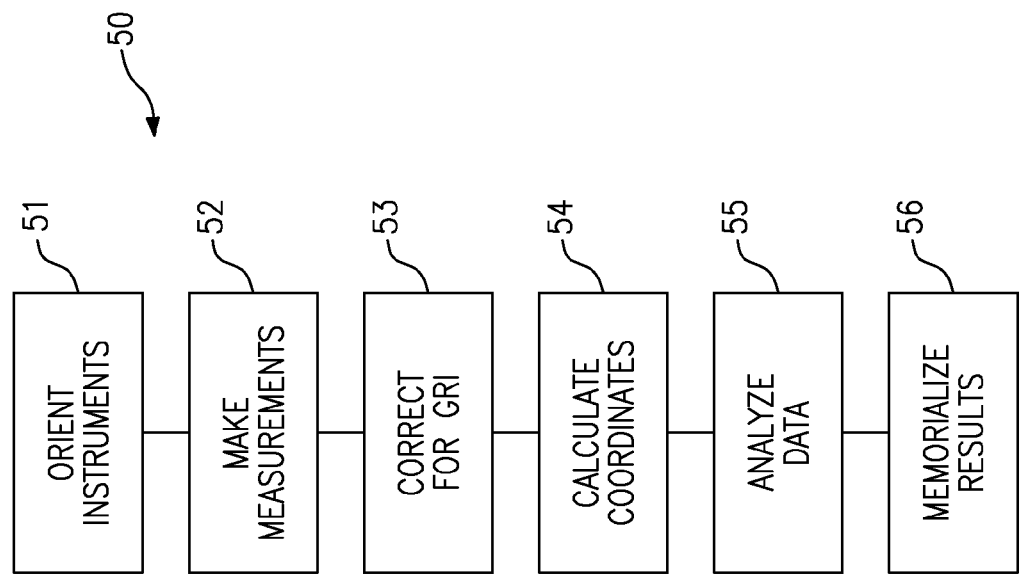
FIG. 5 is a flow chart of the measurement and analysis for the preferred embodiment.

A Structural Health Monitoring Program can be divided into two stages. In the first stage 40, as shown in FIG. 4, the structure is equipped for measurement with permanent fixturing. In the second stage 50, as shown in FIG. 5, the actual measurements are repeated over time, typically using portable instruments.

Stage One

In the US, bridges are typically inspected by State Highway Departments or Railroad owners. Engineers for the responsible agency or owner need to identify cardinal points 41 on the structure that serve as indicators of the health of the structure—including points that should not move in at least one direction. These cardinal points can be added on for existing structures or identified and built into new construction at the design phase.

Stable reference points on the ground need to be established 42 to serve as a reference coordinate system as well as instrument mounting locations. Ideally, electricity and network communications 43 will be available at the instrument locations. In cases of bridges across wide rivers or marshes, it may be necessary to drive pilings to be used as reference points and instrument mountings in order to optimize the geometry of the measurements.

An uncertainty analysis 44 needs to be conducted to determine the optimum geometry for the instrument locations. The software package STAR*NET, described hereinabove, includes a planning utility which generates the error analysis for surveys based on the geometry, instrument accuracies, etc.

Retroreflectors need to be mounted on the structure 45. Due to the relatively low cost and robust design of retroreflectors, they can be left on the structure permanently—although calibration should be taken into account so that the cardinal point can be recovered if the retroreflector require replacement over the life of the structure. Multidirectional retroreflectors, as described in '053 hereinabove, are suggested in order to avoid the Abbe errors.

A conventional survey at the 3 mm uncertainty level is conducted 46 to find the approximate coordinates for instrument pointing.

Stage Two

A means for orienting instruments 51 on a known bench mark is required in order to point the instrument to the approximate coordinates. For example, a Kelvin mount, as used with the PSH97, may be used if the instrument also has a Kelvin mount. More traditionally, instruments measure to reference marks to orient the instruments.

Measurements will be taken to all points and ideally between cooperating instruments 52 to strengthen the baselines. Corrections for temperature, humidity, and pressure, will be made 53 by weather instruments (including possibly acoustic thermometry) or by refractometer measurements based on known baselines. The data will be reduced by multilateration calculations to produce the most accurate coordinate measurements 54.

It will be understood that the measurements can be under static conditions or dynamic load conditions, depending on the nature of the analysis being conducted. While the measurements are preferably performed simultaneously by a plurality of EDM instruments, some meaningful measurements could be made by moving a single instrument to each location. This would probably need to be done in the evening or on overcast days to avoid thermal changes. The data will be analyzed 55 and maintained in the permanent records 56 of the agency or owner for monitoring changes over the life of the structure.

Once the cardinal points and bench marks are established the first time, the process can be repeated by a two person crew in a few hours. For example, a State Highway Department or Railroad can have a traveling crew that could conduct the field survey for several bridges per day. For a more detailed study, or critical structure, the instruments can be operated over a long period of time or be permanent installations.

Example Using a Finite Element Model

Figure 2:
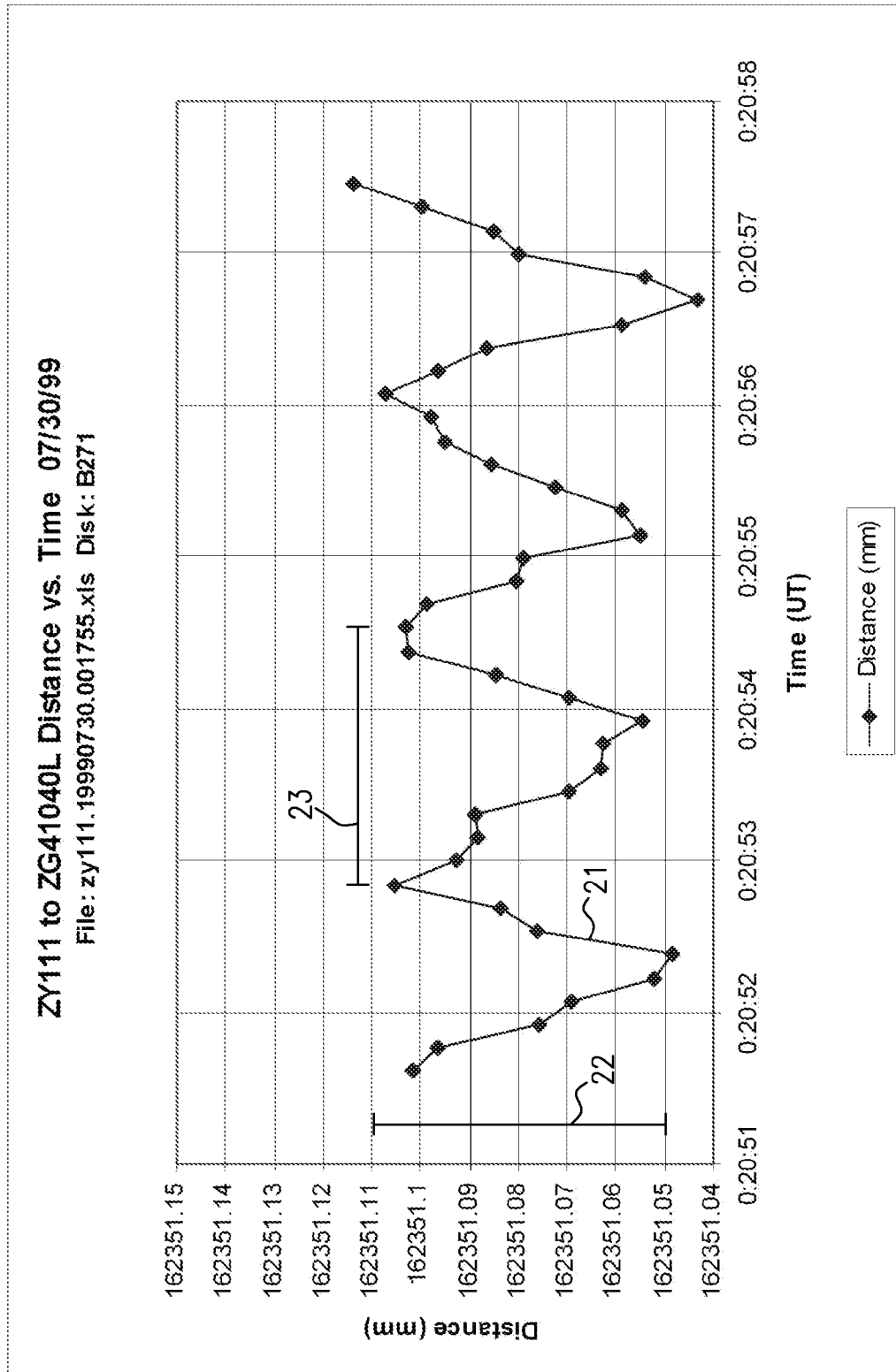
FIG. 2 is a plot of prior art EDM measurements of natural frequency vibrations.
Figure 3:
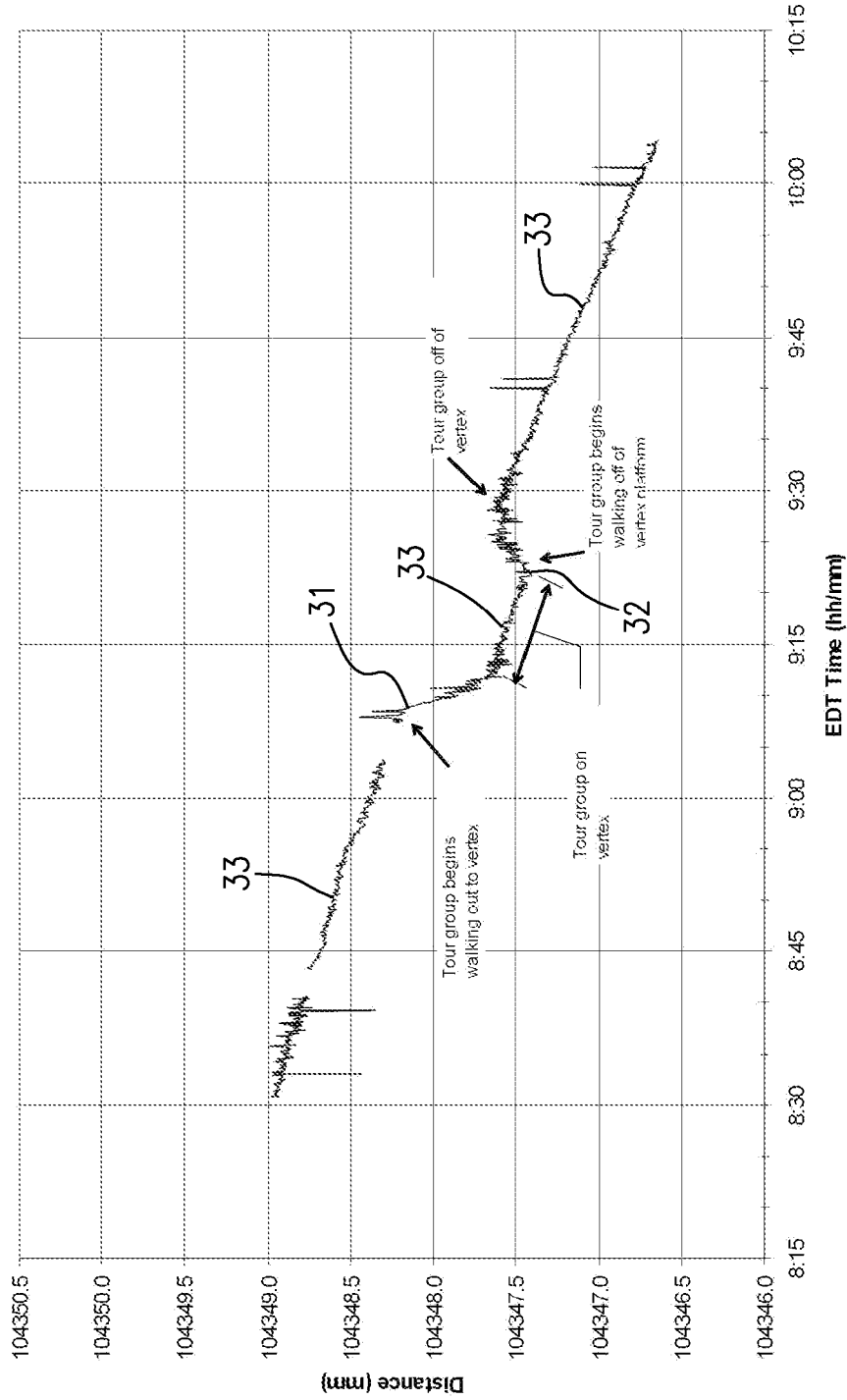
FIG. 3 is a plot of prior art EDM measurements of thermal drift and deflections produced by a tour group walking on a structure.

Most new structures will have a finite element model. As explained hereinabove; the problem is that due to the inherent stiffness, and large size of civil structures, the finite element models are difficult to check experimentally. By using electronic distance measurements from a plurality of locations, extremely accurate measurements can be made to a plurality of points on the civil structure. Moreover, measurements can be made from long distances, as shown in FIGS. 1-3.

Figure 6:
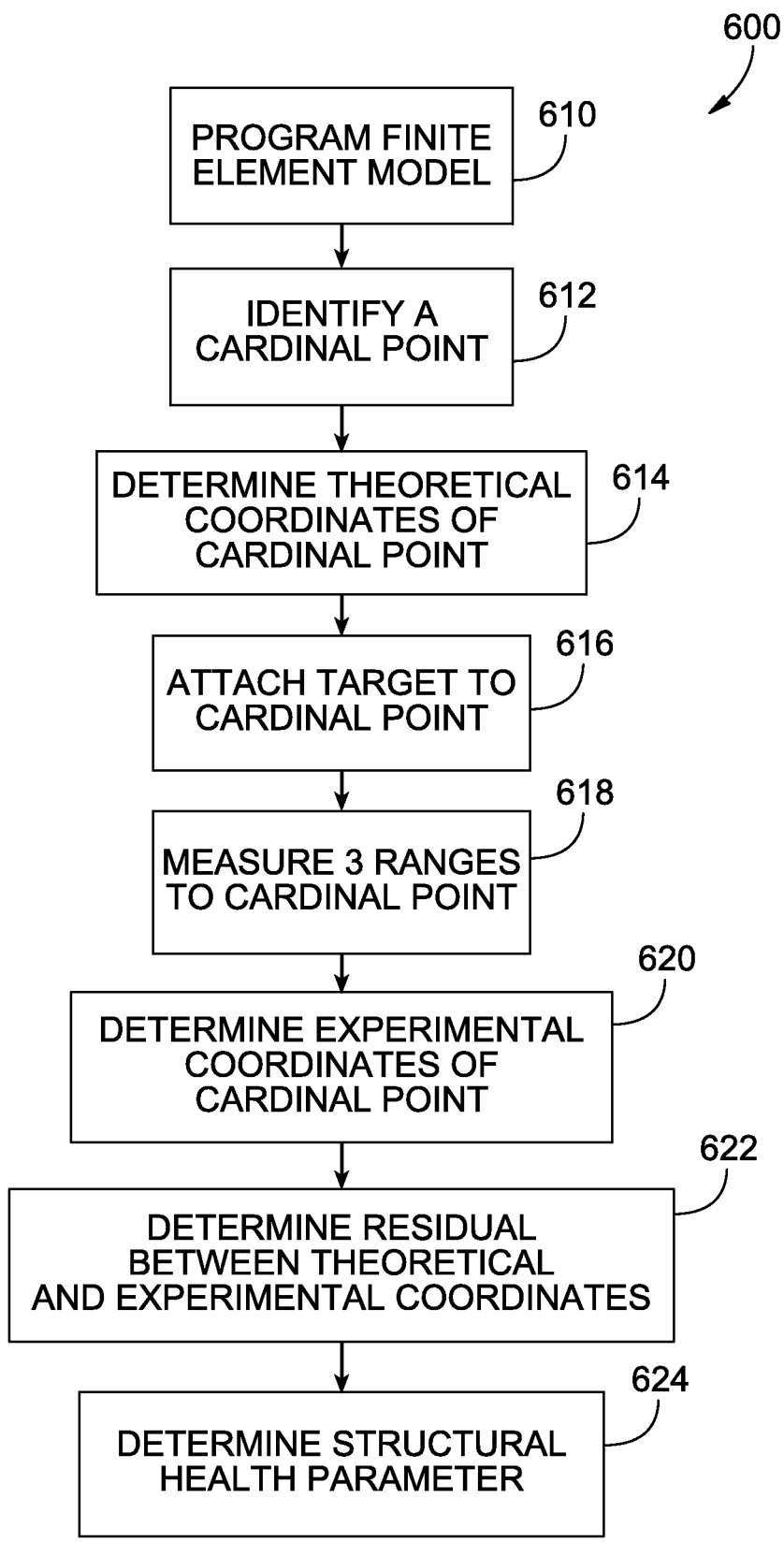
FIG. 6 is a flow chart showing how a finite element model and EDM can be used to determine structural health.

FIG. 6 shows a method 600 using a finite element model in conjunction with experimental EDM measurements to determine structural health parameters. The finite element model is programmed 610 based on materials properties, loading, industry standards, rules of thumb, and other parameters well known in the art. Many assumptions must be made in order to approximate ideal models. For example, a joint may be modeled as a pin free to rotate about an axis, and thus does not exhibit a torque about the axis of the pin—even though the joint may in fact be bolted or welded. Forces may be modeled to intersect at a virtual point. In reality, the actual structure is sure to deviate slightly from the ideal model.

Based on engineering experience and the finite element model, cardinal points can be identified 612 which serve as good indicators of the fidelity of the model to reality. The coordinates of the cardinal points 614 are identified and targets are attached 616. Due to the stiffness of the structure, movements of the cardinal points under various loads may be small, and thus high precision measurements are necessary. For example, the deflection of a bridge under the load of a car may be of the order of a fraction of a mm in the vertical direction. Deflections in directions normal to the vertical may be even less in a healthy structure. However, an asymmetry in the structure may result in slight movements in unexpected directions which would probably go undetected in conventional measurements, such as strain gages or LVDT transducers. Due to the expense of conventional transducers, it is not common to instrument a structure for unexpected conditions. For example, if a member fails or deforms, the loads will shift to a new equilibrium condition. This may require twisting or shifting of members in directions that they would not normally move. By making strong measurements in all 3 dimensions, such unexpected movements of a fraction of a mm would be easily detected. For example, in the case of the I-35W bridge gusset plate, the forces reached a new equilibrium condition. This probably produced slight movements in unexpected directions which propagated to points that may have been measured by EDM, and thus investigated as to the cause of the unexpected movements.

Range measurements are made from three or more locations to each cardinal point 618, and experimental coordinates are determined 620. The residual, or difference between the theoretical and experimental coordinates, is determined 622.

From the residual 622, structural health parameters may be determined 624. Small residuals will bolster confidence in the finite element model, quality of construction, and serve as evidence that verifiable performance specifications have been met. Unexpected residuals may identify errors in the finite element model, or identify potential problem areas that require further inspection.

It will be recognized that the analysis can be extended to vibration and modal analysis. For example, the stiffness of a structure is directly related to the lowest natural frequency. The stiffer the structure is, the higher the lowest natural frequency. For example, the Green Bank Telescope weighs 16,727,000 lbf and has a lowest natural frequency of around 0.9 Hz. The entire structure is welded steel construction, i.e., there are no bolts or rivets which can slip. As a result, the damping coefficient is very small, or the quality factor Q is very high, where $$Q = 2\pi \frac{\text{energy stored}}{\text{energy dissipated per cycle}}. \quad (2)$$

For this reason, the structure rings for a long time after a disturbance. Any change in the natural frequency or Q of the structure would be a sure sign of a problem. For example, a crack would result in a less stiff structure, which would lower the natural frequency. It would also dissipate energy faster, and thus the Q would go down.

Example Using Characteristic Behavior of a Civil Structure

Most older structures have not been modeled using modern finite element model analysis. However, there are many characteristics that can be developed from first principles and engineering experience—for all civil structures. As explained hereinabove, it is generally understood that a structure should be linear, move as a smooth function, exhibit symmetric deformations along lines of symmetry and between similar structures, not have cracked members, not operate beyond the elastic limit, not exhibit hysteresis, not exhibit higher order harmonics, not exhibit creep, not exhibit a high damping coefficient, not move after an event, not move over time, not change in dynamic behavior over time, and other characteristics of the like that are well known in the art. Even though an unhealthy structure may not exhibit an anomaly in any of these characteristics, an anomaly can be an indicator that closer inspection is required. In particular, a significant change in any characteristic could be an indicator for immediate inspection.

Figure 7:
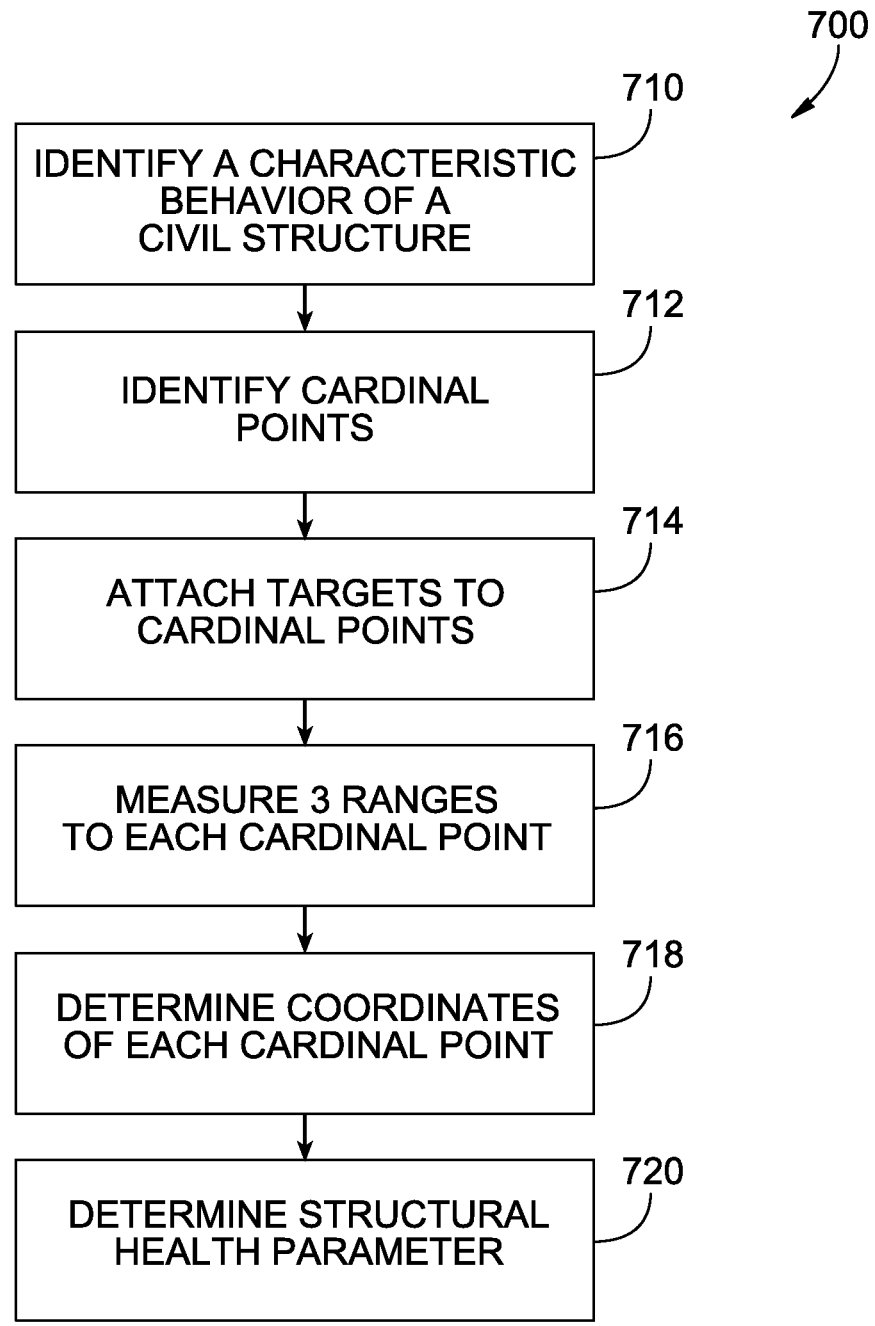
FIG. 7 is a flow chart showing how characteristic behavior and EDM can be used to determine structural behavior.

One method that exploits these characteristics 700 is shown in FIG. 7. Based on engineering experience, a host of characteristics may be identified 710. Depending on the characteristic behavor being investigated, cardinal points can be identified 712 that will serve as good indicators. Targets are attached to the cardinal points 714. Measurements of at least 3 ranges to each cardinal point are made by EDM instruments from stable reference points 716. Coordinates are determined for each cardinal point 718 based on the ranges. Analysis of the coordinates will give strong indicators as to the structural health of the civil structure 720.

Example of a Tower Crane

Figure 8:
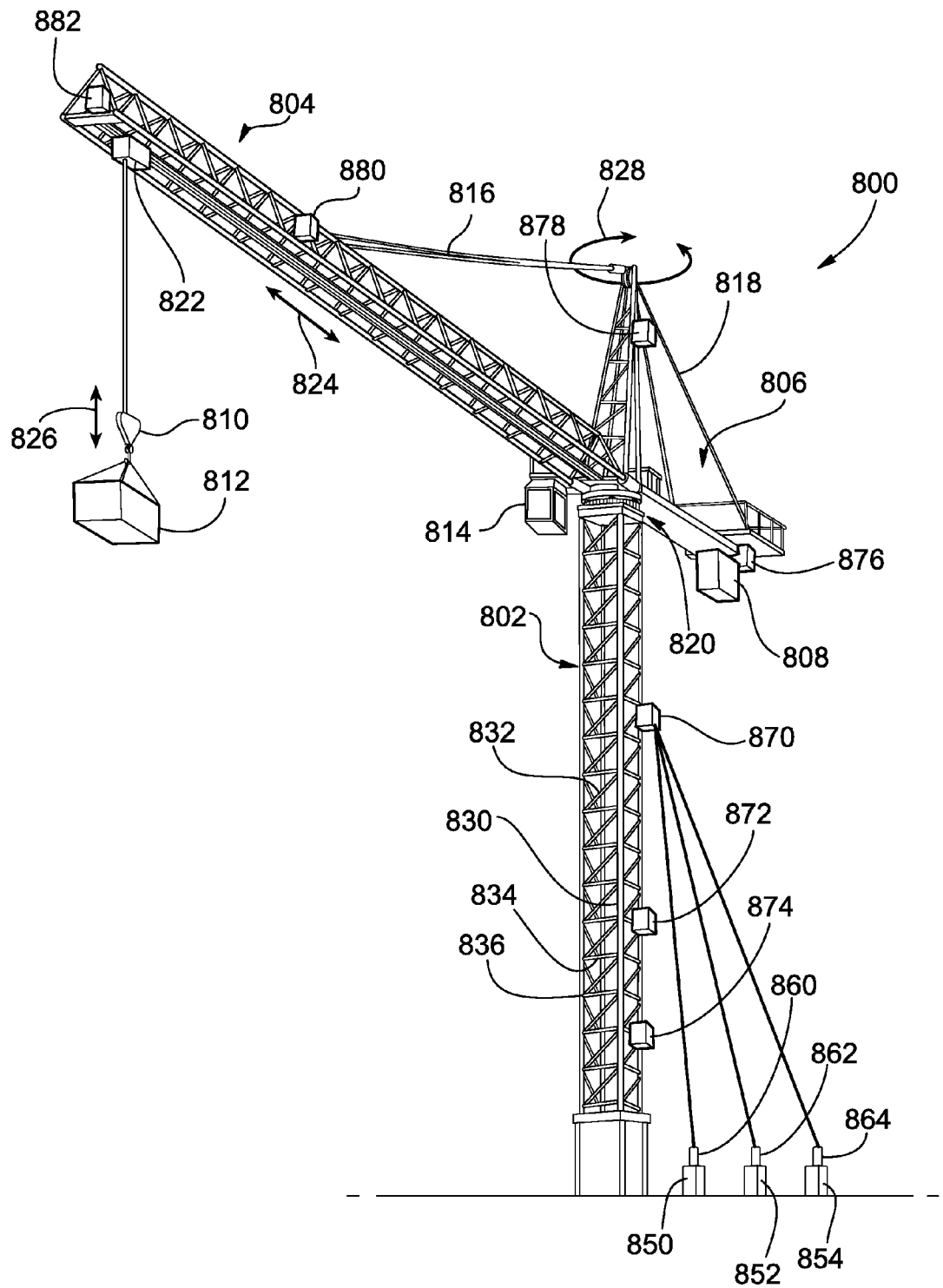
FIG. 8 shows a tower crane being measured.

An example of a tower crane 800, as shown in FIG. 8 will serve to illustrate the method. The tower crane 800 has a rigid tower 802 supporting a load boom 804 and a counterweight boom 806 and counterweight 808. The load boom lifts the load hook 810 and load 812. The operator typically operates the crane 800 from a cab 814 that moves with the load boom 804 for optimal visibility. The load boom 804 is supported by a cable 816 which counters the load 812 by the counterweight 808 and another cable 818. The load boom 804 rotates on the tower 802 via a bearing and drive system 820. The load hook 810 travels along the load boom 804 via a trolley 822 in a radial direction 824, and in the vertical direction 826. By rotating about the tower axis 828, the load 812 can be positioned by the operator. The tower 802 is typically constructed of vertical members 830 with diagonal braces 832 and horizontal braces 834 with welded joints 836. Sections are typically bolted or pinned together in the field.

Electronic distance measurements are made from at least 3 stable instrument locations 850, 852, 854 by EDM instruments 860, 862, 864. Targets are located at a plurality of cardinal points 870, 872, 874, 876, 878, 880, 882. For example, cardinal points 870, 872, 874 on the tower 802 would be good indicators of bending of the tower under load. Ideally, the tower should bend linearly with load 812, and the points on the tower should deflect as a beam fixed at one end, as is well known in the art. For a load balanced by the counterweight, the tower should be straight and in pure compression. Any deviation may be an indication of buckling, which can result in a dramatic failure.

The torque on the tower should be linear with the radial distance of the load 812 from the center of the tower 802. As the boom is rotated about the axis of the tower 828, the moment on the tower will shift directions and vertical members 830 that are in compression will shift to tension, in a sinsoidal function, as the boom 804 is rotated in a complete circle. However, if a joint 836 has a crack, the behavior will not be linear when the load shifts from compression to tension, i.e., the tower will exhibit a non-linear characteristic.

If there is a slippage of the joint, or the crack grows, the tower will exhibit hysteresis, i.e., when the boom 804 returns to the original orientation, the tower will not return to the original coordinates. Using trilateration with three instruments, or multilateration with additional instruments, the coordinates of the cardinal points can be resolved to a fraction of a mm, which will enable engineers to make very good assessments as to the structural health of the tower crane.

As shown in FIG. 8 the top cord of the load boom 804 will be in tension, and the bottom cord will be in compression, due to the cable 816 and tower 802 supporting the load 812. If the trolley 822 is moved inside the cable 816 support point, the loads on the load boom 804 will reverse, i.e., the bottom cord will be in tension. By watching the behavior of targets 882, 880 on the load boom 804, an engineer could make an educated judgment as to the health of the load boom 804.

It will be recognized that based on the teachings of the spirit of the invention, a similar analysis can be conducted for other types of cranes and civil structures.

Crane manufacturers establish safe wind loads. Of course this could depend on many factors which can not be determined in the field. The net result is that the load limits are set very conservatively. This results in a lot of lost time if the guidelines are strictly followed, or possible accidents if judgment calls are incorrect. An architecture as shown in FIG. 8 could be used to set safe operating conditions based on actual deflections in real time. This would result in less lost time, safer lifts, and reduced insurance rates. Factors which could easily offset the expense of the electronic distance measurement instrumentation 860, 862, 864.

In the case of lifts near the manufacturer's limits, or engineered lifts, 29 CFR 1926.550 (a)(1), quoted hereinabove, a qualified engineer is required to document and record the limitations. Needless to say, an engineer would feel much more confident in any recommendations if there were objective measurements upon which to base such recommendations. In the absence of such measurements the engineer is likely to recommend against a questionable lift, which may require bringing in additional equipment or delaying the project. Of course an accident would be even worse. In either case, bringing in EDM instrumentation to make actual measurements would be much more cost effective.

Other Civil Structure Applications

It will be understood by those skilled in the art that the spirit of the methods are not limited to a bridge or crane. For example, after the Sep. 11, 2001 terrorist attack in New York, the structural integrity of buildings in proximity to the World Trade Center were in question. By measuring cardinal points on buildings with respect to a local reference coordinate system before an incident, post incident measurements could assure confidence in the integrity of a building.

Had the World Trade Center Towers been equipped with EDM instrumentation on 9/11, measurements could have provided warning that the building was creeping. For example, the structure should have been rising due to the morning sun warming the structure. The coefficient of expansion for steel is around 11 parts per million/° C. A point 150 meters (approximately 500 feet) up the structure would rise approximately 1.6 mm/° C. Points above the fire would rise even more. By measuring the differential between the top and mid section of the structure, it would have raised concers to see the mid section rising, while the top was creeping down instead of up.

Buildings are also susceptible to such things as subsidence due to; foundation faults, water main breaks, tunneling for utilities or commuter rail system construction, earthquakes, hurricanes, or the like. Building integrity can also be called into question by fires, explosions, ramming, renovations, etc.

Indoor sporting arenas, such as the aforementioned Hartford Civic Center and Kemper Arena, have very large open roof structures. Unusual conditions, such as wind or snow loads may put the structure under loads approaching the maximum limit. The invention could be used to monitor conditions of the roof—particularly when it is occupied by thousands of people attending an event.

It would be useful to monitor the health of cranes, or structures in amusement parks, such as roller coasters—in particular when conducting engineered lifts near the design capacity of the crane, or in crowded locations which would endanger life or property in the event of an accident.

U.S. Pat. No. 7,580,800 and US 2008/0006087 to Winter et al., both incorporated by reference, describe inspection of canopy structures—such as canopies at fueling stations. The methods describe the state-of-the-art for inspecting such structures. It will be recognized by those skilled in the art that a much better method would be by making high precision EDM measurements of cardinal points on the structure while subjecting the structure to controlled loading conditions, such as pulling on predefined points on the canopy using a come along, or chain hoist, with a load cell to measure the applied load, and monitoring the movements of the canopy. Hidden interior rust would be evident based on excessive deflections, symmetry, and fidelity to the finite element model for such loading conditions.

Modern civil structures undergo extensive Finite Element Model analysis in the design phase. A number of assumptions must be made in order to simplify the analysis. In the aircraft industry, the models are checked against experimental data to confirm the safety of an aircraft design. In the case of one-of-a kind civil structures, the FEMs are hardly ever checked against the as-built structure. These methods could provide feedback to the FEMs and identify errors in the models.

It will also be recognized that the architecture described could be used indoors, similar to U.S. Pat. No. 7,194,326, Methods and Systems for Large-Scale Airframe Assembly to Cobb et al., incorporated by reference herein, where higher accuracy is desirable. The architecture could be used outdoors for such large-scale applications as ship building and repair, broadcast towers, dams, etc. It is routine practice to inspect roller coasters daily. However, real-time measurements of roller coaster structures would provide additional assurances and reduce insurance rates.

Pressure Vessel Structural Health Applications

Turning now to applications of EDM instrumentation to measure the safety and performance of pressure vessels, we disclose heretofore unknown methods for measuring and testing large pressure vessels—such as boilers, receivers, nuclear reactor containment structures, storage tanks, tank trucks, railway tank cars, ships, buoyant structures, reservoirs, vacuum chambers, aircraft, spacecraft, and the like. An extensive search of the prior art, which was summarized in the background hereinabove, failed to find any use of electronic distance measurement instrumentation to make actual measurements of deformations of pressure vessels over time, variable pressure load conditions, or variable mechanical load conditions. Exemplary embodiments will serve to illustrate the methods, in light of which, the spirit of the invention will be recognized by those skilled in the art to be adaptable to solving related measurement and testing problems for other applications.

Containment Building

U.S. Pat. No. 4,080,256 ('256) to Braun et al., incorporated by reference herein, discloses a containment structure for a commercial nuclear power reactor. The right cylindrical, domed roof, concrete structure, disclosed in 1974 is the now iconic structure associated with PWR containment buildings. BWR containment buildings typically employ a smaller containment design with a more conventional outer building. While a PWR design will be used in this example, it will be recognized that similar methods can be applied to a BWR containment structure.

Braun describes the containment building as being about 200 feet in height, and about 140 feet in diameter, with a larger below grade truss section about 180 feet in diameter and about 36 feet in depth. The containment is reinforced concrete with a thickness of around two feet and precompressed by tendons which are tensioned by anchors and tensioning apparatus. As explained hereinabove, in the event of a loss of coolant accident, the containment structure is designed to contain the steam and hydrogen gas up to a design pressure of around 80 psig, i.e., the entire building is designed to perform as a pressure vessel.

As required by 10 CFR Appendix J to Part 50, the containment building must undergo periodic testing to verify the performance and safety of the pressure vessel. The most basic test is to pressurize the containment building, close the pressure source, and watch the pressure for indications of leaks, i.e., if the pressure goes down, they look for the source of the leak. For example, there are pressure lock doors with seals, and many sealed penetrations for pipes and cables through the concrete wall which can fail.

There are no known prescribed test methods which actually measure the deformation of the pressure vessel under the pressure test. For example, under a pressure of 80 psig, a 140 foot diameter dome would experience a vertical force $f_y$ of $$f_y = 80\pi(70 \times 12)^2 \quad (3)$$
$$= 177\,336\,622 \text{ lbf} \quad (4)$$

lifting the dome. This would produce a vertical stress $\sigma_y$ in the 2 foot thick concrete wall of approximately $$\sigma_y = \frac{80\pi(70 \times 12)^2}{\pi 140 \times 12 \times 2 \times 12} \quad (5)$$
$$= 1\,400 \text{ lbf/in}^2 \quad (6)$$

and a hoop stress $\sigma_\theta$ in the 2 foot thick concrete wall of $$\sigma_\theta = \frac{80 \times 70 \times 12}{2 \times 12} \quad (7)$$
$$= 2\,800 \text{ lbf/in}^2 \quad (8)$$

It is well known in the art that concrete has very low tensile strength. The strength to contain the forces for an internally pressurized containment building are due almost entirely to the internal reinforcement bar and tendons. The exact strength depends on the design, but we can get an order of magnitude for the deflections by an estimation.

Young's modulus E is $$E = \frac{\text{stress}}{\text{strain}} \quad (9)$$
$$= \frac{\sigma}{\Delta L/L} \quad (10)$$
$$= \frac{\sigma}{\epsilon} \quad (11)$$

which is around 29 000 000 lbf/in² for steel. If we temporarily assume the containment building is made entirely of steel, which is much stronger in tension that reinforced concrete, we can get a conservative estimate for the minimum deformations. The change $\Delta$ in the length L of the cylindrical structure would be $$\Delta L = \frac{\sigma_y L}{E} \quad (12)$$
$$= \frac{1\,400 \times 236 \times 12}{2.9 \times 10^7} \quad (13)$$
$$= 0.136 \text{ in} \quad (14)$$

or 48 ppm, and the increase in circumference $\Delta C$ would be $$\Delta C = \frac{\sigma_\theta C}{E} \quad (15)$$
$$= \frac{2\,800\pi \times 140 \times 12}{2.9 \times 10^7} \quad (16)$$
$$= 0.509 \text{ in} \quad (17)$$

or a change in the radius of 0.081 in, or about 96 parts per million (ppm).

If we assume reinforced concrete in tension has a more realistic Young's modulus of 10% of that of steel, the deformations would be 10 times those estimated for all steel. Deformation of magnitudes much much less than expected are clearly measurable by EDM. For gross deformations, single total stations could be used. If one wanted to conduct tests at reduced pressures, e.g., under safer conditions or more frequently, laser tracker instruments would be required. If one wanted to look at fine detail, such as looking for asymmetries in the response of the pressure vessel due to such things as deteriorated (or improperly placed) reinforcing bars or tendons, cracks, stresses around penetrations or doors; measurement by multilateration would be much more conclusive.

Figure 9:
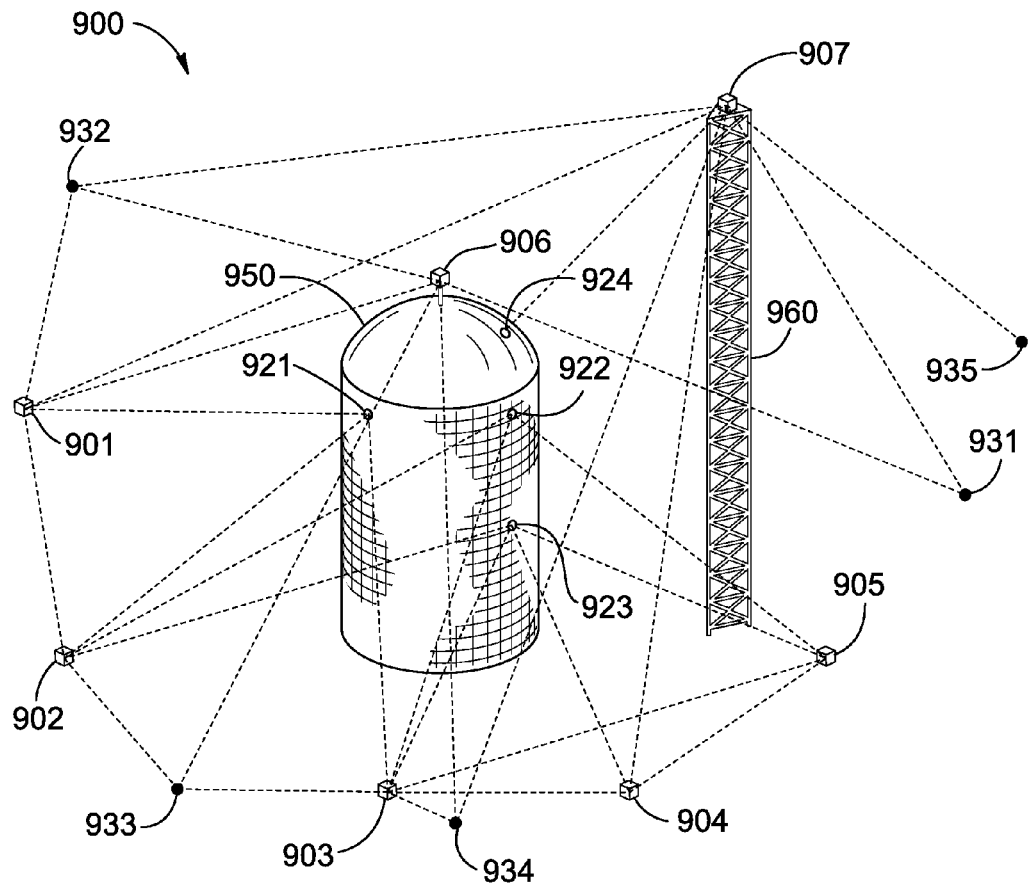
FIG. 9 shows a nuclear power plant containment structure being measured.

One embodiment of a measurement and testing architecture 900 is shown in FIG. 9. Containment building 950 is equipped with retroreflector targets 921, 922, 923, 924 around the cylindrical wall and dome roof.

Preliminary work would be similar to the description for measuring a civil structure in FIG. 4. Multidirectional retroreflectors, as described in US reissued patent RE41877 to Parker, incorporated by reference hereinabove, are ideal for such applications. Multiple instruments can simultaneously measure to a common virtual reflection point using passive retroreflectors.

EDM instruments are attached to stable ground monuments 901, 902, 903, 904, 905. In order to measure to the dome roof, a tower 960 is equipped with an EDM instrument 907. In order to get an accurate location for the tower mounted instrument 907, stable targets are mounted in a fixed geometry on the ground 931, 932, 933, 934, 935. Distances between the tower instrument 907 and the fixed ground targets 907/931, 907/932, 907/934, 907/935 can be used to uniquely determine the coordinates of the instrument.

An EDM instrument can also be mounted on the top of the dome 906 which can measure to fixed ground targets 906/931, 906/932, 906/933, 906/934. Ground instruments 901, 902, 903, 904, 905 can also measure to the ground targets 931, 932, 933, 934, 935. The ground monuments may also be equipped with targets which facilitate measurements between instruments 901, 902, 903, 904, 905, 906. Moreover, the instruments may be equipped with targets which can be turned to cooperate with neighboring instruments to measure between instruments, as described hereinabove for the model PSH97 instruments. The net result is a complex virtual truss architecture of distance measurements which can be used to measure three-dimensional (3-D) coordinates with an accuracy of around 0.100 mm and a resolution of around 0.010 mm.

Measurement procedures and data analysis could be similar to those described in FIGS. 5-7 mutatis mutandis. For example, the location of cardinal points on the containment structure could be measured over the life of the structure. Any changes in the shape or symmetries would be indicators of concern. The structure could be pressure tested at full load and measured to look for changes over the life of the structure. A negative pressure could be applied, which would provide valuable data for hysteresis due to cracks, improperly pretensioned tendons, etc. Lower pressure tests could be conducted while the plant is in operation, or on a routine basis.

Ground Transportation

Pressure vessels used to transport materials present additional opportunities for measuring and testing by EDM. In addition to forces exerted by the contents of the vessel, tanks used in transportation are also exposed to forces due to transportation. Increased safety margins are required to protect the public in the event of an accident or leak and to reduce liability for property damages.

For example, as explained in U.S. Pat. No. 4,805,540 ('540) to Mundloch et al., incorporated by reference herein, in railway tank cars, the cylindrical tank is part of the railcar structure. Modern US tank cars no longer have a center sill running between the two couplers to carry the draft load of the train. Instead, a stub sill and coupler is attached to each end of the tank. The tank is attached to the stub sill by a saddle arrangement as described in U.S. Pat. No. 5,351,625 to Culligan et al., U.S. Pat. No. 5,467,719 to Dalrymple et al., and U.S. Pat. No. 7,806,058 to Saxton et al. for example, all three of which are incorporated by reference herein. Each stub sill is pivotally connected to a truck with 4 wheels and springs to support the respective end and roll on the tracks. The coupler forces are transferred from a first coupler on a first end through a first stub sill to the tank, through the tank, to a second stub sill, and to a second coupler on a second end.

As explained in '540, because the stub sill assembly and the coupler are attached to the lower side of the car, there is a significant moment introduced into the tank structure by the coupler forces. For example, for the first coupler and the second coupler in tension, or when the slack is out, the forces on the tank will be in tension at the lower side of the tank and in compression at the upper side of the tank. The forces will be reversed when the slack is in.

As explained in '540;

Because the center stub sill assembly and the coupler carried thereby were located somewhat below the level of the bottom of the tank (about 8-12 inches below the bottom of the tank), and because the cylindrical tank structure carried the longitudinal train loads axially of the car, an offset moment arm between the tank structure and the centerline of the coupler was present. This offset resulted in a significant overturning moment being induced in the center stub sill and in the end portion of the tank such that the end of the tank and the center sill assembly must withstand these overturning moments. It will be appreciated that the longitudinal train loads that the car is required to withstand, in accordance with the American Association of Railroads (AAR) is a dynamic or impact load of 1,250,000 pounds and a static squeeze of compression load of about 1,000,000 pounds. Because of the vertical offset and the magnitude of the loads, the overturning moments are very significant.

Under normal operation, the saddle is supported on a center plate which acts as a bearing between the saddle and truck bolster. The center plate mates to a bowl shaped portion on the bolster, much like a thrust washer. This results in minimal twisting of the tank, even if the track is uneven, e.g., at an industrial siding that is privately owned and maintained. However, as explained in U.S. Pat. No. 6,357,363 to Miltaru, incorporated by reference herein, . . . the end portions of the underframe of such a car have to be of relatively heavy construction in order to permit the car when loaded to be supported on jacks located at the corners of the underframe, since there is a relatively long lever arm between the corners of the underframe and the saddle attachment locations, where the weight of the tank and included freight is transferred to the underframe.

As explained in U.S. Pat. No. 5,076,173 to Baker, et al., incorporated by reference herein, AAR requires provisions for vertical lifting of a tank car by a crane, which can also introduce twisting forces into the tank shell. In some cases, such as cars rated for PIH or TIH lading, the structural requirements may be dictated by the ability to withstand a crash, or puncture resistance. U.S. Pat. No. 7,975,622, incorporated by reference herein, is an example of such a TIH rated car.

As detailed hereinabove, transportation of hazardous materials is closely regulated by Congress through the DOT. U.S. Pat. Nos. 6,597,973 ('973), 6,832,183 ('183), and 6,955,100 ('100) to Barich et al., all three of which are incorporated by reference herein, outline how General Electric Railcar Services Corporation conducts inspections in compliance with 49 CFR non-destructive testing (NDT) regulations. Transportation of corrosive lading requires lining or coating to protect the integrity of the tank as explained in '973. A lining presents additional challenges, since the lining prevents visual inspections of the inside of the tank. Leaks in the lining can allow corrosive material to weaken the tank shell.

Thickness of the tank shell is typically measured by ultrasound measurement, but there are no known measuring and testing methods using large-scale dimensional measurements of tank cars in the prior art.

Figure 10:
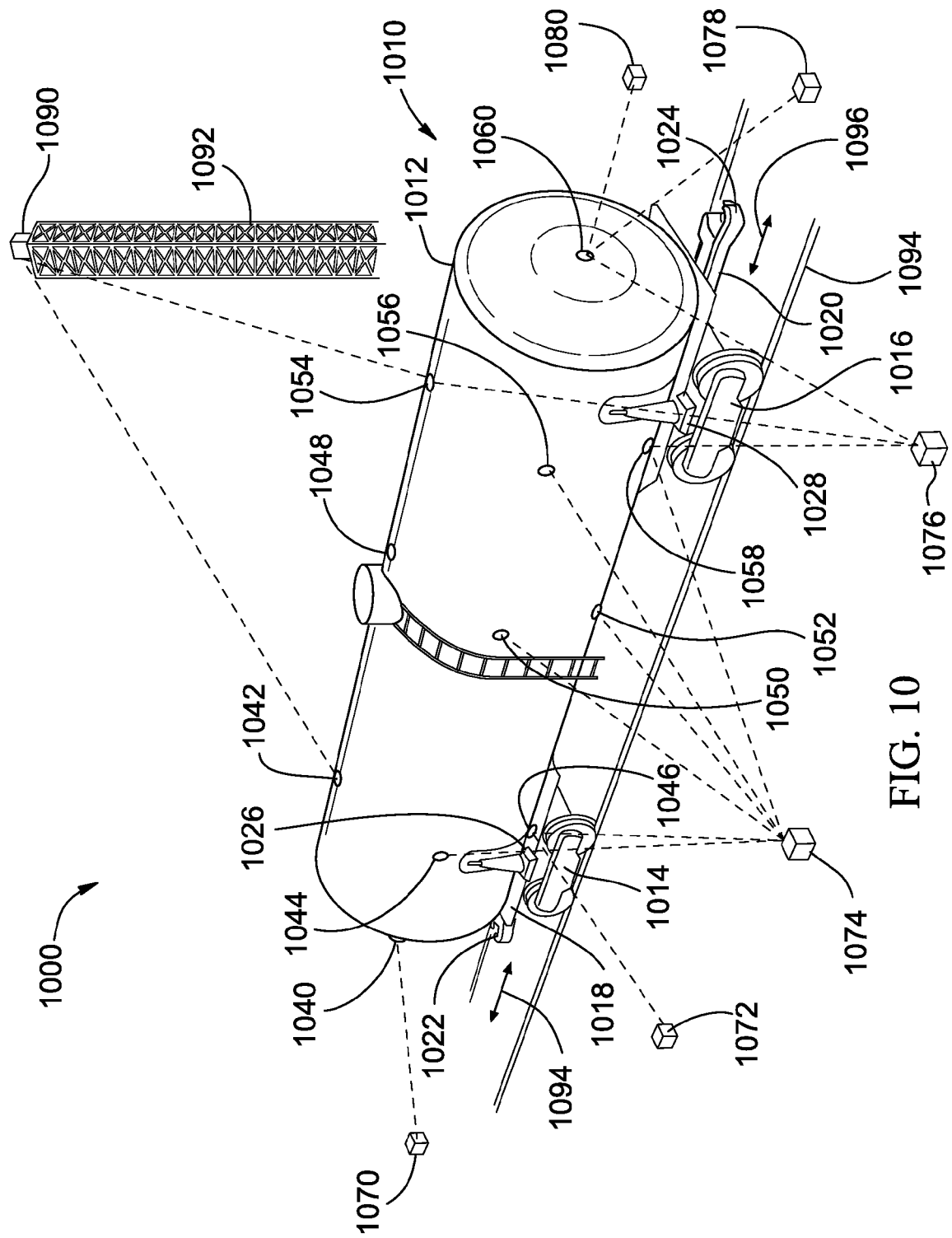
FIG. 10 shows a railway tank car being measured.

Turning now to FIG. 10, one embodiment of an architecture 1000 for measuring and testing a railway tank car 1010 is disclosed. The tank car 1010 includes a tank shell 1012 supported by trucks 1014, 1016 with stub sills 1018, 1020 and couplers 1022, 1024. The stub sills include jacking pads 1026, 1028. The tank shell 1012 is equipped with retroreflector targets 1040, 1042, 1044, 1046, 1048, 1050, 1052, 1054, 1056, 1058, 1060. EDM instruments are located on stable reference points 1070, 1072, 1074, 1076, 1078, 1080. An elevated EDM instrument 1090 is located on tower 1092. In one embodiment, additional EDM instruments may be located in a pit (not shown) below the track 1094 in order to measure additional points under the tank shell 1012 from below.

In one method, the EDM instruments measure all of the targets visible to each instrument. The EDM instruments also measure between stable reference points. The 3-D coordinates are determined for each target under a first condition. For example, the first condition may be unloaded. The first condition is modified to a second condition. For example, the second condition may be a change in internal pressure of the tank; lifting a corner of the car at a jacking pad 1026, 1028; or exerting a tension or compression force 1094, 1096 on the couplers 1022, 1024. By repeating the EDM measurements and determining the changes in the 3-D coordinates, the deformations for the prescribed load conditions can be determined. The load conditions can then be modified again and the measurement process repeated. It will be recognized that parameters such as linearity and hysteresis can be determined from such measurements. In particular, due to the fusion welded design of tank cars, there should be little or no hysteresis and non-linearity. By applying a slight vacuum inside the tank, any cracks would be put into compression instead of tension. This would result in a deviation from a linear response, i.e., the tank would be slightly stronger under a vacuum load. The degree of the deviation could provide a good indication of fracture cracking.

The measuring and testing can be repeated on a periodic basis, e.g., annually, every 5 years, etc. It will be recognized that such a method can be implemented in a semiautomated program. The only manual operation would be to re-attach the retroreflector targets to benchmark pads welded to the tank shell and apply the load conditions. For example, to test the 280,000 tank cars in the fleet every 5 years, 1076 cars would have to be tested per week. Assuming five day operation of three shifts, this would require testing around 9 cars per hour. This would probably require 9 inspection stations across the US.

Exerting the tension or compression force 1094, 1096 on the couplers 1022, 1024 can be by a hydraulic jack and anchor fixtures designed to exert 1 250 000 lbf in the horizontal direction. This may require a heavy grade beam between the ends of the car to anchor the fixturing against the large forces and moments produced by the jack and anchor. Due to the sensitivity of the EDM measurements, the pressure and coupler load testing may be conducted at reduced pressures and forces for some tests—which would make the tests safer to conduct and less expensive fixturing could be used.

For some investigations, the tank may be dynamically tested by exciting the tank cavity into resonant vibrational modes. This is relatively easily achieved by driving the tank cavity with pulses of air, or other methods well known in the art. By measuring such things as the resonant frequencies and the Q of the tank, the presence of cracks could be ruled out. The amplitude of the low frequency resonant mode vibrations are easily measured by EDM.

While using tank cars to illustrate the methods, the same principles can be applied to motor carriers. Again, measurement procedures and data analysis could be similar to those described in FIGS. 5-7 mutatis mutandis.

Aircraft

It will now be recognized that the methods described for civil structures, containment structures, and railway tank cars can be adapted in the same spirit for aircraft. For example, in the cited cases of the Aloha Airlines flight 243 and Southwest Airlines flight 812, measurements of three-dimensional coordinates of cardinal points of the fuselage at the 1 part per million accuracy would likely detect anomalies in the linearity and hysteresis of the aircraft undergoing pressurizations. In particular, defects such as elongated holes would be particularly evident by positively pressurizing the cabin while measuring the deformations, returning the cabin to ambient pressure, and then negatively pressurizing the cabin. When the forces are reversed between positive and negative cabin pressure, the joints will slip nonlinearly and the condition at ambient will depend on the path from positive pressure to ambient or negative pressure to ambient, i.e., there will be a difference in the shape of the fuselage depending on the previous state. Moreover, the cracks will be subject to asymmetric strength depending on the direction of the forces—which of course should not be the case for a healthy structure.

Reservoirs

Reservoirs can be classified as both a civil structure and a pressure vessel. Pumped-storage reservoirs for electrical power generation are a particularly interesting application. There are 19 such reservoirs in the US operated by 19 different companies:

1. Bad Creek, S.C.—Duke Power
2. Bath County, Va.—Dominion Virginia Power
3. Blenheim-Gilboa, N.Y.—New York Power Authority
4. Cabin Creek, Colo.—Xcel Energy
5. Castaic, Calif.—Los Angeles Department of Water & Power
6. Gianelli, Calif.—California Department of Water Resources
7. Helms, Calif.—Pacific Gas and Electric
8. Jocassee, S.C.—Duke Energy Carolinas
9. Ludington, Mich.—CMS Energy
10. Mount Elbert, Colo.—US Bureau of Reclamation
11. Muddy Run, Pa.—Excelon Power
12. Northfield Mountain, Mass.—FirstLight Power Resources
13. Olivenhain-Hodges, Calif.—San Diego County Water Authority
14. Racoon Mountain, Tenn.—Tennessee Valley Authority
15. Rocky Mountain, Ga.—Oglethorpe Power
16. Salina, Okla.—Grand River Dam Authority
17. Seneca, Pa.—FirstEnergy
18. Smith Mountain, Va.—Appalachian Power
19. Taum Sauk, Mo.—Ameren Missouri On Dec. 14, 2005 the Taum Sauk, Mo. reservoir suffered a breach in the dike, which catastrophically emptied the reservoir causing injuries and significant property damages. While the root cause of the accident was an equipment and operator failure which resulted in overfilling the reservoir, the structural failure illustrates the potential for injuries and property damages from a structural failure.

It is well known in the art that fatigue is often correlated with the number of stress cycles an element undergoes. In the case of pumped-storage dams and reservoirs, the ideal condition is for the reservoir to be completely filled each evening during minimal power demand and emptied each day during peak power demand. Unlike conventional dams, this results in the load on the dam being cycled every day.

In one embodiment, EDM instruments could be used to measure the deformations of such a structure and watch for long term movements and changes in the performance of the structure.

SUMMARY

In all of the examples, it will be recognized that the number and location of the instruments and targets shown is merely illustrative and the number and location of instruments and targets will be selected for the desired parameters being measured.

It will be recognized that the same principles of symmetry, linearity, hysteresis, creep, damping coefficient, fidelity to a finite element model, etc., as described for civil structures hereinabove can be applied to measurements of large pressure vessels, such as, but not limited to, boilers, receivers, storage tanks, ships, buoyant structures, reservoirs, vacuum chambers, spacecraft, and the like.

The description, drawings, and preferred embodiments serve to illustrate the invention, and are not to be construed as limitations of the invention, which is defined by the appended claims. It will be clear to those skilled in the art that modifications may be made without departing from the spirit of the invention.

What is claimed is:

1. A method for determining structural health of a pressure vessel with steps comprising:
   (a) measuring a plurality of cardinal points fixed to said pressure vessel from a plurality of locations, wherein said cardinal points are identified based at least in part on engineering experience and a finite element model as being good indicators of fidelity of the finite element model of said pressure vessel to reality, at least one retroreflector is attached to each of said cardinal points, a plurality of electronic distance measurement instruments are mounted in a stable reference coordinate system, and a central processor coordinates and time synchronizes said measuring by said plurality of electronic distance measure-merit instruments;
   (b) measuring at least a first range from a first electronic distance measurement instrument to a first cardinal point, a second range from a second electronic distance measurement instrument to said first cardinal point, and a third range from a third electronic distance measurement instrument to said first cardinal point, wherein said first electronic distance measurement instrument is at a first location, said second electronic distance measurement instrument is at a second location, said third electronic distance measurement instrument is at a third location, and wherein said first location, said second location, and said third location are three different locations;
   (c) storing at least said first, second, and third ranges;
   (d) computing a first three-dimensional coordinate of said first cardinal point, in said stable reference coordinate system, based at least in part on said first, second, and third ranges;
   (e) determining at least a first structural health parameter of said pressure vessel based at least in part on said first three-dimensional coordinate, said coordination and synchronization by said central processor, and said finite element model; and
   (f) storing said first structural health parameter.

2. The method of claim 1 further comprising;
   (a) measuring at least; a fourth range from said first electronic distance measurement instrument to a second cardinal point, a fifth range from said second electronic distance measurement instrument to said second cardinal point, and a sixth range from said third electronic distance measurement instrument to said second cardinal point; (b) storing at least said fourth, fifth, and sixth ranges;
   (c) computing a second three-dimensional coordinate of said second cardinal point, in said stable reference coordinate system, based at least in part on said fourth, fifth, and sixth ranges;
   (d) determining at least a second structural health parameter of said pressure vessel based at least in part on said second three-dimensional coordinate, said coordination and synchronization by said central processor, and said finite element model; and
   (e) storing said second structural health parameter.

3. The method of claim 2 further comprising;
   (a) determining at least a fourth structural health parameter of said pressure vessel based at least in part on said first three-dimensional coordinate, said second three-dimensional coordinate, said coordination and synchronization by said central processor, and said finite element model; and
   (b) storing said fourth structural health parameter.

4. The method of claim 1 further comprising;
   (a) measuring at least; a seventh range from a fourth electronic distance measurement instrument to a third cardinal point, an eighth range from a fifth electronic distance measurement instrument to said third cardinal point, and a ninth range from a sixth electronic distance measurement instrument to said third cardinal point, wherein said fourth electronic distance measurement instrument is at a fourth location, said fifth electronic distance measurement instrument is at a fifth location, said sixth electronic distance measurement instrument is at a sixth location, and wherein said fourth location, said fifth location, and said sixth location are three different locations;(b) storing at least said seventh, eighth, and ninth ranges;
   (c) computing a third three-dimensional coordinate of said third cardinal point, in said stable reference coordinate system, based at least in part on said seventh, eighth, and ninth ranges;
   (d) determining at least a third structural health parameter of said pressure vessel based at least in part on said third three-dimensional coordinate, said coordination and synchronization by said central processor, and said finite element model; and
   (e) storing said third structural health parameter.

5. The method of claim 4 further comprising;
   (a) determining at least a fifth structural health parameter of said pressure vessel based at least in part on said first three-dimensional coordinate, said third three-dimensional coordinate, said coordination and synchronization by said central processor, and said finite slement model; and
   (b) storing said fifth structure.

6. The method of claim 1 further comprising;
(a) performing steps a-f of claim 1 at a first epoch in time;
(b) performing steps a-f of claim 1 at a second epoch in time;
(c) determining at least a sixth structural health parameter of said pressure vessel based at least in part on said first epoch in time, said second epoch in time, said coordination and synchronization by said central processor, and said finite element model; and
(d) storing said sixth structural health parameter.

7. The method of claim 6 wherein the time between said first and second epochs in time is greater than one day.

8. The method of claim 6 wherein the time between said first and second epochs in time is less than one day.

9. The method of claim 6 wherein the time between said first and second epochs in time is less than ½ of a period of a fundamental frequency of natural vibrations of said pressure vessel.

10. The method of claim 6 wherein at least one parameter affecting the pressure vessel is changed between said first and second epochs in time.

11. The method of claim 6 wherein a relative uncertainty of said first, second, and third ranges, between said first and second epochs in time, is less than 0.01 mm.

12. The method of claim 1 wherein an absolute uncertainty of said first, second, and third ranges is less than 0.1 mm.

13. A method for measuring structural health of a pressure vessel by experimentally testing a finite element model of the pressure vessel, with steps comprising:
(a) programming the finite element model of the pressure vessel;
(b) identifying a first cardinal point on the pressure vessel based at least in part on engineering experience and the finite element model as being a good indicator of fidelity of the finite element model to reality;
(c) determining a first set of theoretical coordinates of the first cardinal point, wherein the first set of theoretical coordinates are determined based at least in part on the finite element model for the first cardinal point;
(d) attaching at least one retroreflective target to the first cardinal point, wherein the retroreflective target attached to the first cardinal point has a known mechanical relationship and a known optical relationship with respect to the first cardinal point;
(e) measuring at least a first range from a first electronic distance measurement to the first cardinal point; a second range from a second electronic distance measurement instrument to the first cardinal point, and a third range from a third electronic distance measurement instrument to the first cardinal point; wherein the first electronic distance measurement instrument is at a first location, the second electronic distance measurement instrument is at a second location, the third electronic distance measurement instrument is at a third location; the first location, the second location, and the third location are three different locations in a stable reference coordinate system; and the measurements by the first, second, and third electronic distance measurement instruments are coordinated and time synchronized by a central processor;
(f) determining a first set of experimental coordinates of the first cardinal point, wherein the first set of experimental coordinates is determined at least in part based on the first range, the second range, and the third range;
(g) determining a first residual vector from the first set of theoretical coordinates to the first set of experimental coordinates; and
(h) determining at least a first structural health parameter of the pressure vessel based at least in part on the first residual vector, the coordination and time synchronization by the central processor, and the finite element model.

14. The method of claim 13, wherein the first structural health parameter is based on a magnitude of the first residual vector.

15. The method of claim 13, wherein the first structural health parameter is based on a direction of the first residual vector.

16. The method of claim 13, wherein the programming of the finite element model is adjusted based at least in part on the first set of experimental coordinates.

17. The method of claim 13, further comprising steps of:
(a) identifying a second cardinal point on the pressure vessel based at least in part on engineering experience as being a good indicator of fidelity of the finite element model to reality;
(b) determining a second set of theoretical coordinates of the second cardinal point, wherein the second set of theoretical coordinates is determined based at least in part on the finite element model for the second cardinal point;
(c) attaching at least one retroreflective target to the second cardinal point, wherein the retroreflective target attached to the second cardinal point has a known mechanical relationship and a known optical relationship with respect to the second cardinal point;
(d) measuring at least a fourth range from the first electronic distance measurement to the second cardinal point, a fifth range from the second electronic distance measurement instrument to the second cardinal point, and a sixth range from the third electronic distance measurement instrument to the second cardinal point;
(e) determining a second set of experimental coordinates of the second cardinal point, wherein the second set of experimental coordinates is determined at least in part based on the fourth range, the fifth range, and the sixth ranged;
(f) determining a second residual vector from the second set of theoretical coordinates to the second set of experimental coordinates; and
(g) determining at least a second structural health parameter of the pressure vessel based at least in part on the second residual vector, the coordination and time synchronization by the central processor, and the finite element model.

18. The method of claim 17, wherein all of the steps of claim 13 and claim 17 are repeated for a plurality of load conditions for the pressure vessel.

19. The method of claim 17, wherein all of the steps of claim 13 and claim 17 are repeated for a plurality of stages of construction for the pressure vessel.

20. The method of claim 17, wherein all of the steps of claim 13 and claim 17 are repeated for a plurality of times, and wherein a period for the plurality of times is less than 0.5×a period for a lowest natural frequency for the pressure vessel.

21. The method of claim 17, wherein the programming of the finite element model is adjusted based at least in part on the first set of experimental coordinates and the second set of experimental coordinates.

22. A method for measuring structural health of a pressure vessel, with steps comprising:
(a) identifying at least one characteristic behavior of the pressure vessel, wherein the characteristic behavior is based at least in part on a principle selected from the group consisting of linearity, symmetry, hysteresis, creep, vibration, damping coefficient, and combinations thereof;

(b) identifying a first cardinal point on the pressure vessel based at least in part on engineering experience as being a good indicator of fidelity of a model of the characteristic of the pressure vessel to reality;

(c) attaching at least one retroreflective target to the first cardinal point, wherein the retroreflective target attached to the first cardinal point has a known mechanical relationship and a known optical relationship with respect to the first cardinal point;

(d) measuring at least a first range from a first electronic distance measurement to the first cardinal point, a second range from a second electronic distance measurement instrument to the first cardinal point, and a third range from a third electronic distance measurement instrument to the first cardinal point; wherein the first electronic distance measurement instrument is at a first location, the second electronic distance measurement instrument is at a second location, the third electronic distance measurement instrument is at a third location; the first location, the second location, and the third location are three different locations in a stable reference coordinate system; and the first, second, and third electronic distance measurement instruments are coordinated and time synchronized by a central processor;

(e) determining a first set of experimental coordinates of the first cardinal point, wherein the first set of experimental coordinates is determined at least in part based on the first range, the second range, and the third range;

(f) identifying a second cardinal point on the pressure vessel based at least in part on engineering experience as being a good indicator of fidelity of the model of the characteristic to reality;

(g) attaching at least one retroreflective target to the second cardinal point, wherein the retroreflective target attached to the second cardinal point has a known mechanical relationship and a known optical relationship with respect to the second cardinal point;

(h) measuring at least a fourth range from the first electronic distance measure-merit to the second cardinal point, a fifth range from the second electronic distance measurement instrument to the second cardinal point, and a sixth range from the third electronic distance measurement instrument to the second cardinal point;

(i) determining a second set of experimental coordinates of the second cardinal point, wherein the second set of experimental coordinates is determined at least in part based on the fourth range, the fifth range, and the sixth range;

(j) determining at least one structural health parameter of the pressure vessel based at least in part on the first set of experimental coordinates, the second set of experimental coordinates, the model of the characteristic, the coordination and time synchronization by the central processor, and the at least one characteristic behavior of the pressure vessel.

(k) wherein all of the steps are repeated for a plurality of times, and wherein a period for the plurality of times is less than 0.5 ×a period for a lowest natural frequency for the pressure vessel.

23. The method of claim 22, wherein all of the steps are repeated for a plurality of load conditions for the pressure vessel.

* * * * *